US010455119B2

(12) United States Patent
Morikawa et al.

(10) Patent No.: US 10,455,119 B2
(45) Date of Patent: Oct. 22, 2019

(54) DISPLAY DEVICE, IMAGE PROCESSING APPARATUS, CONTROL METHODS THEREOF, AND DISPLAY SYSTEM

(71) Applicant: CANON KABUSHIKI KAISHA, Tokyo (JP)

(72) Inventors: Kenichi Morikawa, Kawasaki (JP); Tomokazu Mori, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/021,359

(22) Filed: Jun. 28, 2018

(65) Prior Publication Data

US 2019/0014234 A1 Jan. 10, 2019

(30) Foreign Application Priority Data

Jul. 5, 2017 (JP) .................................. 2017-132257

(51) Int. Cl.
*G06T 5/00* (2006.01)
*H04N 1/407* (2006.01)
*H04N 1/409* (2006.01)
*H04N 1/58* (2006.01)
*G03B 21/00* (2006.01)
*H04N 1/00* (2006.01)
*H04N 1/60* (2006.01)

(52) U.S. Cl.
CPC ............... *H04N 1/58* (2013.01); *G03B 21/00* (2013.01); *H04N 1/00997* (2013.01); *H04N 1/6061* (2013.01); *H04N 1/6077* (2013.01)

(58) Field of Classification Search
CPC .. G03B 21/00; H04N 1/00997; H04N 1/6061; H04N 1/6077; H04N 1/6058; H04N 1/6066; H04N 9/3182; H04N 9/73; H04N 9/68; H04N 5/23232; G06T 2207/20208; G09G 5/02; G09G 3/2003; G09G 3/3607
See application file for complete search history.

(56) References Cited

U.S. PATENT DOCUMENTS 7,599,574 B2 10/2009 Mori
8,072,544 B2 12/2011 Fukuda et al.
2008/0049044 A1* 2/2008 Nitta ..................... G03B 21/14
345/634

FOREIGN PATENT DOCUMENTS

JP 2008-083180 A 4/2008
JP 2008-102483 A 5/2008
JP 2008-145915 A 6/2008

* cited by examiner

*Primary Examiner* — Moustapha Diaby
(74) *Attorney, Agent, or Firm* — Venable LLP

(57) ABSTRACT

Provided is a display device that illuminates a printed material taking into consideration the characteristics of the printed material. The display device obtains an image for illuminating the printed material, and information pertaining to the optical characteristics, such as light reflectance or transmission, of the printed material. Then, on the basis of metadata pertaining to a luminance or color of the obtained image and the obtained information, the display device controls a light source illuminating the printed material. Through this, the display device enhances the dynamic range or the color gamut of the printed material.

17 Claims, 23 Drawing Sheets

FIG. 4A

PRINTED MATERIAL COEFFICIENT TABLE

| PAPER TYPE | PRINTED MATERIAL COEFFICIENT (REFLECTANCE) |
|---|---|
| PAPER A (MATTE) | 0.5 |
| PAPER B (STANDARD) | 0.8 |
| PAPER C (GLOSSY) | 1.2 |

FIG. 4B

| PAPER TYPE | PRINTED MATERIAL COEFFICIENT (TRANSMISSION) |
|---|---|
| PAPER D (FILM) | 0.8 |
| PAPER F (JAPANESE VELLUM PAPER) | 0.2 |

NO PROJECTION

WHOLE-WHITE IMAGE IS PROJECTED

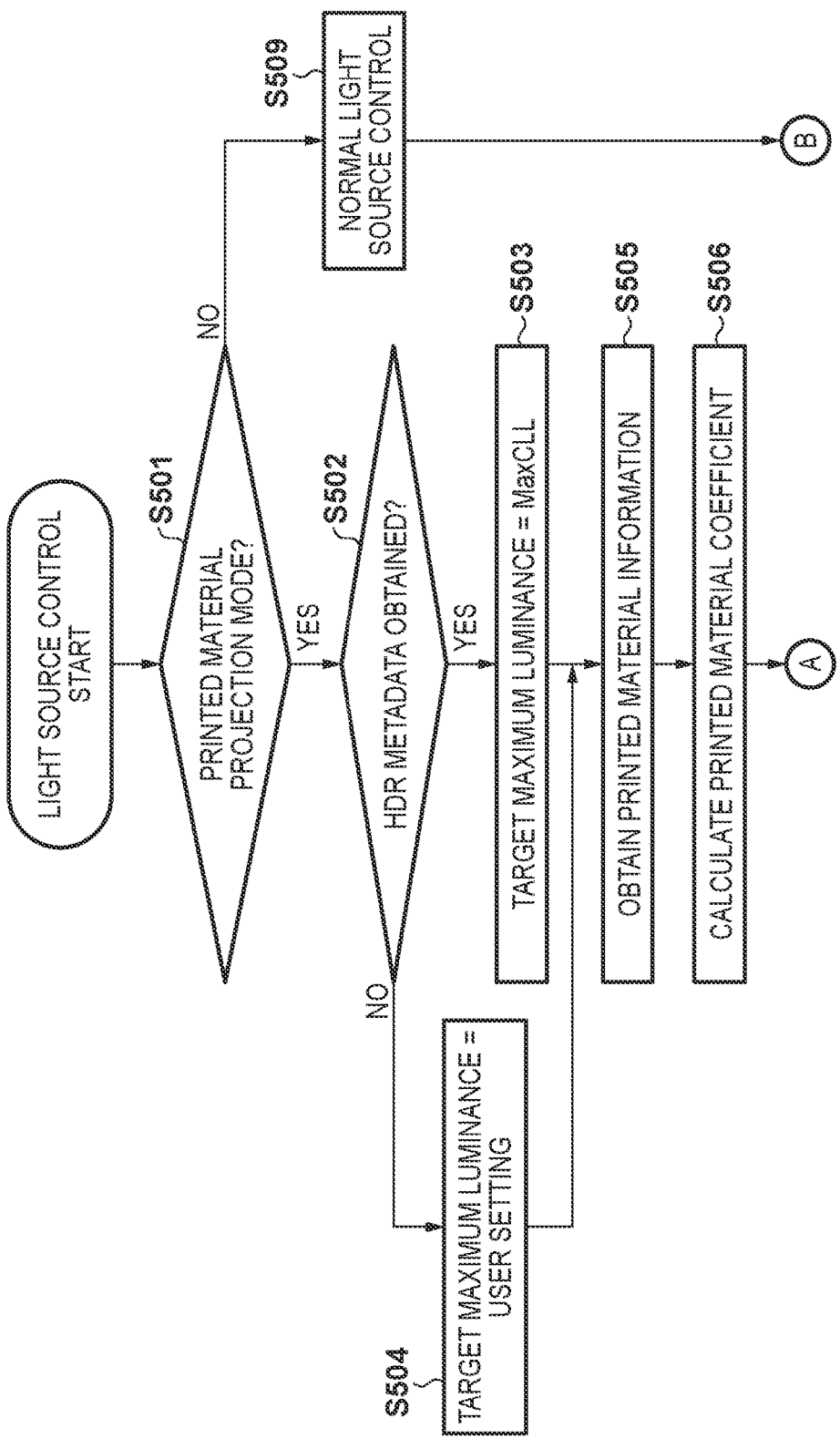

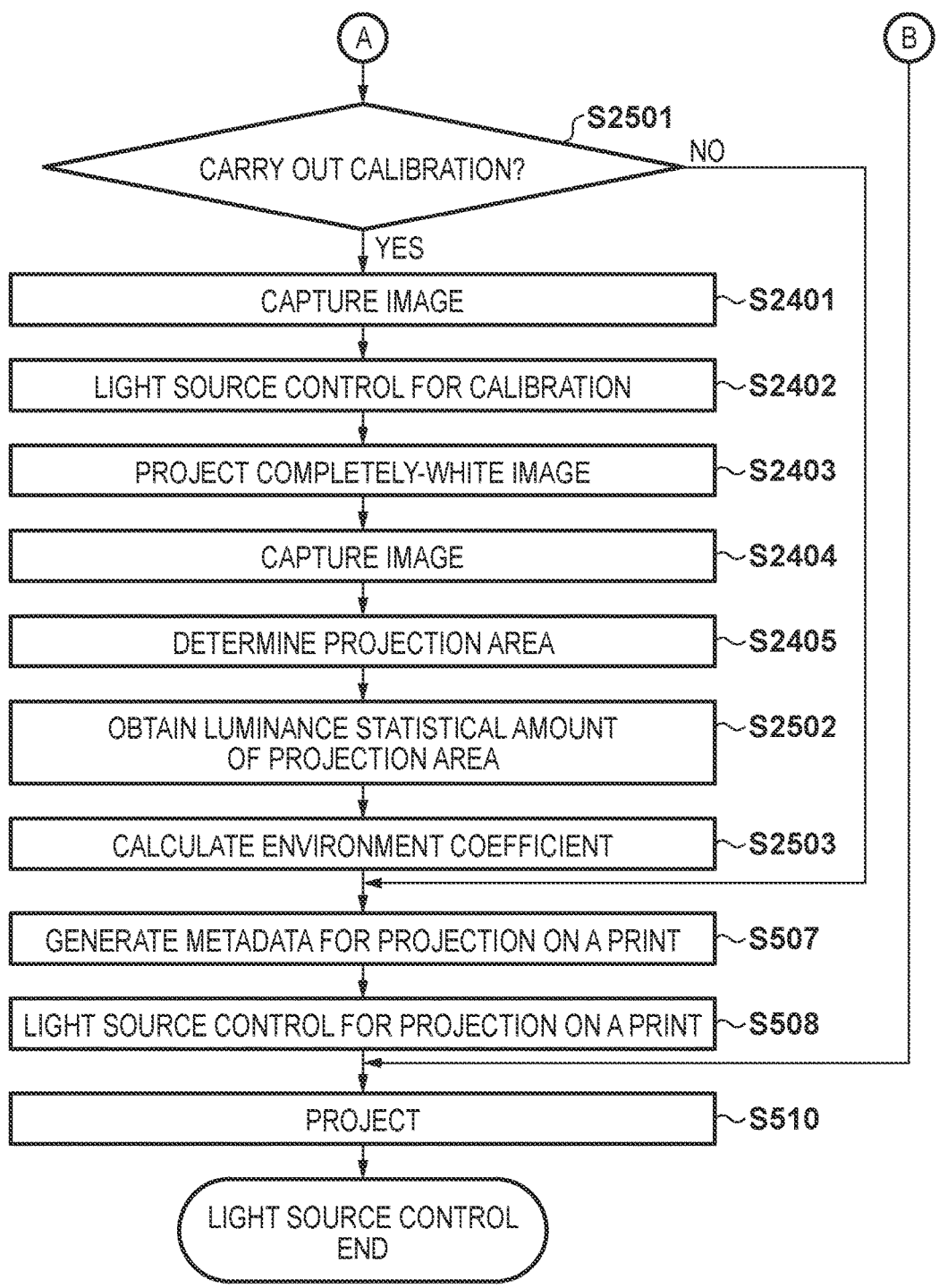

DISPLAY DEVICE, IMAGE PROCESSING APPARATUS, CONTROL METHODS THEREOF, AND DISPLAY SYSTEM

BACKGROUND OF THE INVENTION

Field of the Invention

This invention relates to a display device, an image processing apparatus, control methods thereof, and a display system.

Description of the Related Art

Recently, devices that generate and display high dynamic range (HDR) images, which have broader luminance dynamic ranges than in the past, are being developed.

Meanwhile, a technique that enhances the luminance dynamic range, color gamut, and the like of a printed material by projecting an image, which is registered with the printed content of the printed material, onto the printed material has been proposed (Japanese Patent Laid-Open No. 2008-83180).

However, the contrast, tint, and so on of a printed material differs depending on the type of paper, ink, and so on. It is therefore necessary to consider the characteristics of the printed material when enhancing the luminance dynamic range, color gamut, and so on of the printed material by projecting an image on the printed material. However, Japanese Patent Laid-Open No. 2008-83180 does not mention taking the characteristics of the printed material into consideration when projecting an image on the printed material.

SUMMARY OF THE INVENTION

The invention has been conceived in light of these problems with conventional techniques. One aspect of the invention provides a display device, an image processing apparatus, control methods thereof, and a display system that illuminate a printed material while taking the characteristics of the printed material into consideration.

According to an aspect of the present invention, there is provided a display device capable of enhancing a dynamic range or a color gamut of a printed material by illuminating the printed material, the device comprising: an image input interface that receives an image for illuminating the printed material; an information obtainment circuit that obtains information pertaining to optical characteristics of the printed material; and a light source controller that controls, on the basis of metadata pertaining to a luminance or a color of the image and the information, a light source that illuminates the printed material.

According to another aspect of the present invention, there is provided a projection-type display device that projects an image onto a projection surface using a light source, the device comprising: an image input interface that receives the image; an information obtainment circuit that obtains information pertaining to optical characteristics of the projection surface; and a light source controller that controls the light source on the basis of metadata pertaining to a luminance or a color of the image and the information.

According to a further aspect of the present invention, there is provided a display system comprising: a display device; and an information processing apparatus communicatively connected to the display device, wherein the display device is capable of enhancing a dynamic range or a color gamut of a printed material by illuminating the printed material, the display device comprises: an image input interface that receives from the information processing apparatus an image for illuminating the printed material; an information obtainment circuit that obtains information pertaining to optical characteristics of the printed material; and a light source controller that controls, on the basis of metadata pertaining to a luminance or a color of the image and the information, a light source that illuminates the printed material, and wherein the information processing apparatus sends, to the display device, the image based on an image printed onto the printed material.

According to another aspect of the present invention, there is provided an image processing apparatus that determines print settings of a printed material for illumination by a projection-type display device, the apparatus comprising: an obtainment circuit that obtains information pertaining to a brightness of a location where the printed material is placed; and an determining circuit that determines the print settings on the basis of the information, wherein the determining circuit determines at least one of a recording medium used for printing and an ink type as the print settings.

According to a further aspect of the present invention, there is provided a control method of a display device capable of enhancing a dynamic range or a color gamut of a printed material by illuminating the printed material, the method comprising: receiving an image for illuminating the printed material; obtaining information pertaining to optical characteristics of the printed material; and controlling, on the basis of metadata pertaining to a luminance or a color of the image and the information, a light source that illuminates the printed material.

According to another aspect of the present invention, there is provided a control method of an image processing apparatus that determines print settings of a printed material for illumination by a projection-type display device, the method comprising: obtaining information pertaining to a brightness of a location where the printed material is placed; and determining the print settings on the basis of the information, wherein the determining determines at least one of a type of recording medium and an ink type, used for printing, as the print settings.

According to a further aspect of the present invention, there is provided a non-transitory computer-readable medium storing a program that causes a computer included in a display device being capable of enhancing a dynamic range or a color gamut of a printed material by illuminating the printed material to function as: an image input unit that receives an image for illuminating the printed material; an information obtainment unit that obtains information pertaining to optical characteristics of the printed material; and a light source control unit that controls, on the basis of metadata pertaining to a luminance or a color of the image and the information, a light source that illuminates the printed material.

According to another aspect of the present invention, there is provided a non-transitory computer-readable medium storing a program that causes a computer included in a projection-type display device that projects an image onto a projection surface using a light source to function as: an image input unit that receives the image; an information obtainment unit that obtains information pertaining to optical characteristics of the projection surface; and a light source control unit that controls the light source on the basis of metadata pertaining to a luminance or a color of the image and the information.

According to a further aspect of the present invention, there is provided a non-transitory computer-readable medium storing a program that causes a computer to function as an image processing apparatus that determines print settings of a printed material for illumination by a projection-type display device, the apparatus comprising: an obtainment unit that obtains information pertaining to a brightness of a location where the printed material is placed; and an determining unit that determines the print settings on the basis of the information, wherein the determining unit determines at least one of a recording medium used for printing and an ink type as the print settings.

Further features of the present invention will become apparent from the following description of exemplary embodiments with reference to the attached drawings.

BRIEF DESCRIPTION OF THE DRAWINGS

FIGS. 4A and 4B are diagrams illustrating examples of printed material coefficient calculation tables according to embodiments.

FIGS. 22A and 22B are flowcharts pertaining to display operations according to the sixth embodiment.

DESCRIPTION OF THE EMBODIMENTS

Exemplary embodiments of the present invention will now be described in detail in accordance with the accompanying drawings. The following embodiments will describe a display system in which a projection-type display device (a projector), an image forming device (a printer), and an image processing apparatus or an information processing apparatus (a computer) are separate devices. However, two or more of these three devices may be constituent elements of the same device. Furthermore, the image processing apparatus or the information processing apparatus may be any electronic device having image processing functionality, including computer devices such as smartphones, tablet terminals, and game consoles, digital (video) cameras, and the like.

First Embodiment

Figure 1:
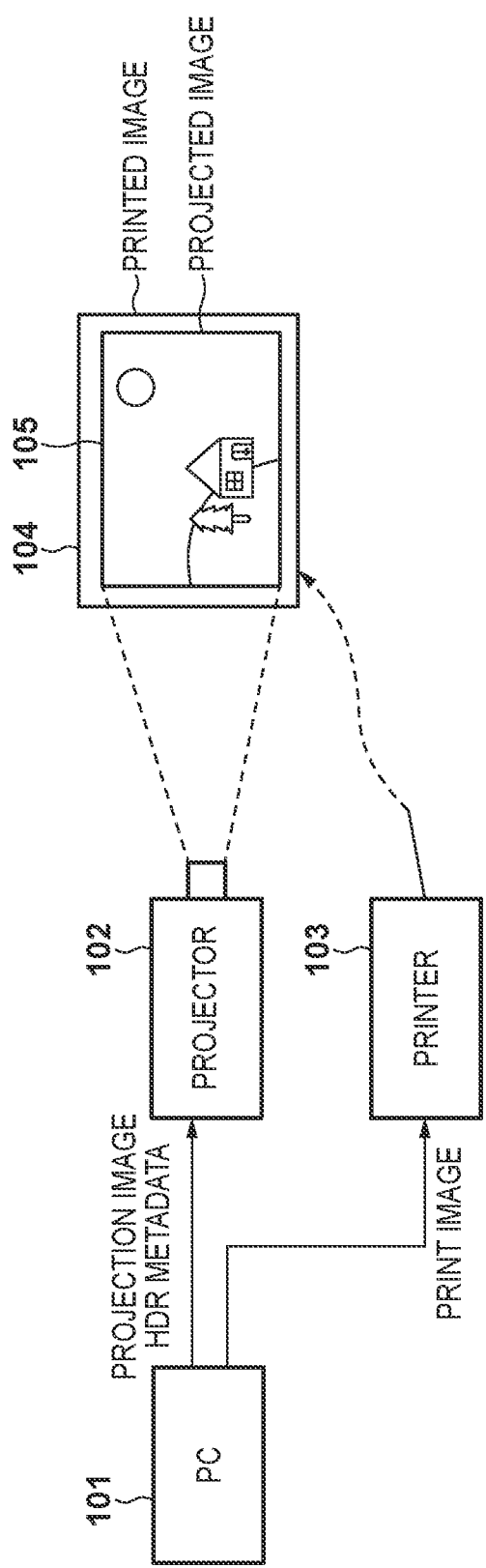
FIG. 1 is a schematic diagram illustrating the configuration of a display system according to a first embodiment.

FIG. 1 is a schematic diagram illustrating the configuration of a display system according to a first embodiment of the invention.

A computer (PC) 101, which is an image processing apparatus, is a typical, commercially-available generic personal computer, for example. The PC 101 executes operations, which will be described later, by running application software in an OS. In this embodiment, the PC 101 generates a projection image (a video signal having a prescribed framerate) and a print image on the basis of the same original image, and sends the projection image to a projector 102 and the print image to a printer 103. The PC 101 also generates HDR metadata and sends the HDR metadata to the projector 102. The HDR metadata may be attached to the original image, or may be set by a user. An example of the configuration of the PC 101 will be described later.

The projector 102, which is a display device, is a liquid-crystal projector, for example. On the basis of HDR parameters, the projector 102 projects an optical image based on the received projection image. The optical image projected onto a projection surface will be called a projected image 105. In this embodiment, the projector 102 uses the projected optical image to illuminate a printed material 104 output by the printer 103 which enhances the luminance dynamic range, color gamut, and so on of the printed material 104 as compared to when the printed material 104 is viewed under ambient light. An example of the configuration of the projector 102 will be described later.

The printer 103 prints onto a recording medium on the basis of the received print image, and outputs the printed material 104 as a result. The surface of the recording medium that is printed onto will be called a "printing surface", and the surface opposite from the printing surface will be called a "rear surface" or a "back surface". Although the recording medium is typically recording paper, a material aside from paper, such as a resin film, may be used instead. Although the printer 103 is assumed to be an ink-jet printer in this embodiment, another type of printer may be used instead. The printer 103 may be any typical, commercially-available printer capable of communicating with the PC 101.

Figure 2:
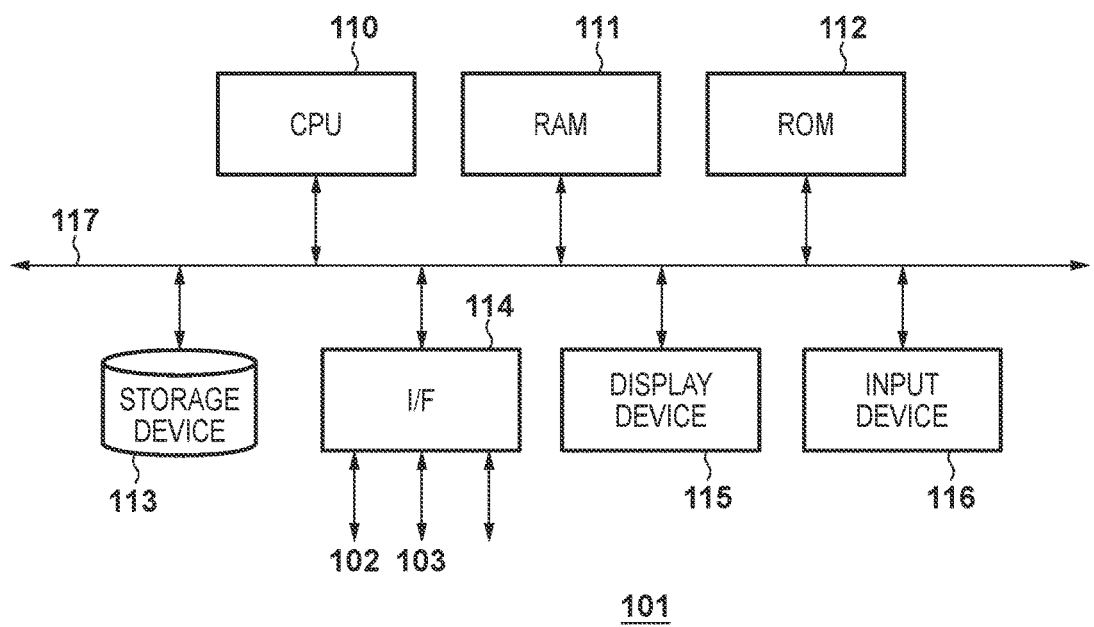
FIG. 2 is a block diagram illustrating an example of the functional configuration of a generic computer that can be used as a PC 101 according to embodiments.

FIG. 2 is a block diagram schematically illustrating an example of the functional configuration of a generic computer device that can be used as the PC 101 according to this embodiment.

A CPU 110 includes one or more programmable processors, and implements functions of the PC 101 by loading programs such as an OS and applications stored in ROM 112, a storage device 113, and the like into RAM 111 and executing those programs. The CPU 110 may include a display controller, a GPU, or the like. Note that operations described as being carried out by the PC 101 are actually implemented by the CPU 110 executing programs.

The RAM 111 is used for loading the programs executed by the CPU 110, storing temporary information of the programs, temporarily buffering data, and so on. The RAM 111 may be partially used as video memory for a display device 115.

The ROM 112 stores programs executed by the CPU 110, various configuration values and parameters, GUI data, and so on. The ROM 112 may also be rewritable.

The storage device 113 stores the OS, application programs, data files, and so on. The storage device 113 may be a hard disk drive, a solid-state drive, or the like.

An I/F 114 is an interface for communicating with external devices, and is typically constituted by an interface group compliant with a plurality of standards. The I/F 114 may include, for example, a wired communication interface compliant with a standard such as USB or Ethernet (registered trademark), a wireless communication interface compliant with a standard such as wireless LAN, Bluetooth (registered trademark), or a mobile phone network (3G, 4G, or the like), and so on. An interface for an external display, compliant with a standard such as HDMI (registered trademark) or DisplayPort, is also included in the I/F 114. In this embodiment, the projector 102, the printer 103, and so on also communicate with the PC 101 via the I/F 114.

A display device 115 is a liquid-crystal display (LCD), for example, and displays various content from the OS, application programs, and so on. The displays in the display device 115 are controlled by the CPU 110.

An input device 116 is one or more input devices, such as a keyboard and a pointing device, through which the user makes inputs into the PC 101.

An example of the functional configuration of the projector 102 will be described next using FIG. 3.

In this embodiment, the projector 102 as a plurality of projection modes including a "printed material projection mode" for projecting an image onto a printed material and a standard "PC mode" for projecting an image onto a screen or the like.

A main controller 200 includes, for example, one or more programmable processors, ROM, and RAM, and implements operations of the projector 102 by loading programs stored in the ROM into the RAM, executing the programs using the programmable processors, and controlling the operations of the various circuits and components described hereinafter.

An image input I/F 201 receives the projection image and the HDR metadata from the PC 101. The image input I/F 201 may be compliant with one or more standards, such as High-Definition Multimedia Interface (HDMI; registered trademark), DisplayPort (DP; registered trademark), or Serial Digital Interface (SDI). Alternatively, the image input I/F 201 may be compliant with a proprietary standard.

An image processor 202 changes the framerate, resolution, image form, and so on of the projection image received from the image input I/F 201, and outputs the result to a liquid-crystal controller 203. The image processor 202 can execute processes such as frame thinning, frame interpolation, resolution conversion (scaling), and distortion correction (keystone correction), but is not limited thereto.

The liquid-crystal controller 203 separates the projection image received from the image processor 202 into R (red), G (green), and B (blue) color components, and adjusts, on a pixel-bi-pixel basis, the transmissivity of liquid-crystal elements 204 on a color component-by-color component basis. A red component optical image constituting the projected image is generated by irradiating red component liquid-crystal elements with red light from a light source 210. A green component optical image and a blue component optical image are generated in the same manner, and the optical images are then input to a projection circuit 205.

The projection circuit 205 combines the generated color component optical images into a single optical image using a prism or the like, and projects the resulting image using a projection lens. The optical image projected onto a projection surface such as a screen or a printed material is called a "projected image" in this specification. The projection circuit 205 includes an actuator and the like for driving the projection lens, which enables functionality such as enlarging, reducing, and adjusting the focus of the projected image.

A metadata obtainment circuit 206 extracts the HDR metadata, which is supported by the projector 102, from the projection image received by the image input I/F 201. A method for extracting the HDR metadata from the projection image is not particularly limited, and for example, the HDR metadata can be obtained through a method supported by the HDR standard with which the projection image is compliant. HDR metadata includes information necessary for the display device to control the luminance.

For example, a Maximum Content Light Level (MaxCLL) and a Maximum Frame Average Light Level (MaxFALL) are added as static HDR metadata to an HDR image compliant with the HDR 10 standard. MaxCLL expresses the maximum luminance of content, whereas MaxFALL expresses the average value of the maximum luminance within a frame.

The metadata obtainment circuit 206, which can also be called "target obtainment means", can determine a target maximum luminance from the HDR metadata, to be used when displaying the input HDR image. Here, the MaxCLL is assumed to be the target maximum luminance, as one example. The "nit" ($=cd/m^2$) can be used as the unit of luminance, for example. Note that the information of the luminance of the HDR image is not limited to being obtained from the metadata. For example, the information may be obtained through another form of communication with the PC 101, or a value set through input devices 211 may be used.

A printed material information obtainment circuit 207 obtains, from printed material information set through the input devices 211, for example, information pertaining to optical characteristics of the printed material. Here, this information is a coefficient pertaining to reflection (a printed material coefficient). Here, the "printed material information" may be one or more of a paper type, an ink type, a size, contrast information, and so on. Here, printed material coefficients based on paper types are prepared in advance as a table such as that illustrated in FIG. 4A, and the printed material information obtainment circuit 207 obtains the printed material coefficients in accordance with the paper type by referring to the table. A higher value for the printed material coefficient indicates a higher reflectance.

Printed material coefficients can also be set in advance in accordance with combinations of multiple types of printed material information, such as the paper type and the ink type. Additionally, a table may be prepared for each type of printed material information, and printed material coefficients based on combinations of multiple types of printed material information may then be obtained by obtaining the printed material coefficient for each piece of printed material information and multiplying using those printed material coefficients, for example. The paper type may be a type such as standard paper or glossy paper, or may be a stock number. For example, even standard paper may have different reflectances depending on the maker, and thus finer control can be implemented by preparing a printed material coefficient for each stock number. With respect to the ink type as well, printed material coefficients may be prepared for types such as dye ink and pigment ink, or printed material coefficients may be prepared for each of stock numbers.

Figure 5A:
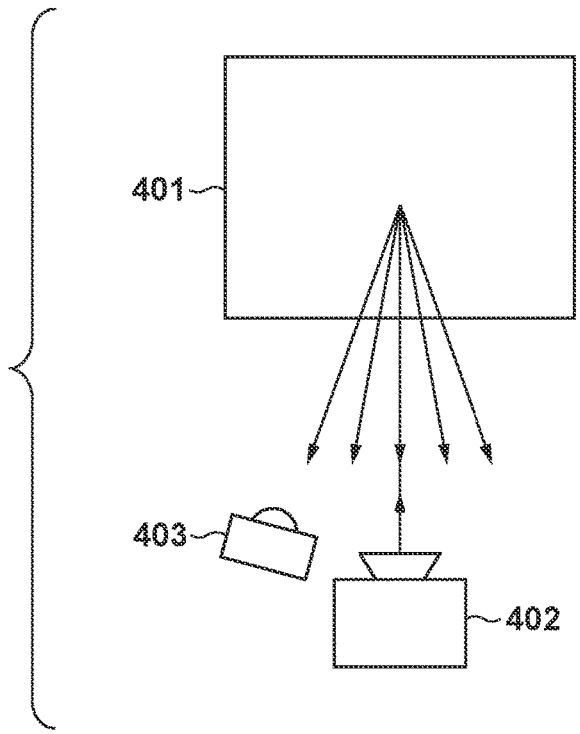
FIGS. 5A and 5B are diagrams illustrating an example of an environment for measuring printed material coefficients according to embodiments.

The printed material coefficients can be determined in accordance with actually-measured values. For example, as illustrated in FIG. 5A, if the printed material coefficients are based on the paper type, a light source 402 is placed facing (blank) paper 401 to be measured, at a prescribed distance. Then, the luminance of the paper 401 when illuminated at a maximum luminance is measured by a luminance meter 403. The printed material coefficient is then determined in accordance with the measured luminance. Note that the light source 402 has spectral properties similar to those of the light source 210 in the projector 102. A value that takes the luminance measured when using a standard white board (a perfect diffuser plate) as the paper 401 can be used as the printed material coefficient, for example.

With respect to image brightness, the printed material coefficients can be determined on the basis of a luminance measured for images having different average luminance on the same paper (e.g., gray patterns having different densities).

The printed material information obtainment circuit 207 outputs the obtained printed material coefficients to a projection metadata generator 208. The printed material information obtainment circuit 207 also outputs the size of the printed material, which is part of the printed material information, to a light source controller 209.

The projection metadata generator 208 generates metadata for projection on a print through the following Formula 1, for example, from the target maximum luminance obtained from the metadata obtainment circuit 206 (the maximum luminance MaxCLL, here) and the printed material coefficient received from the printed material information obtainment circuit 207. The metadata for projection on a print is the target maximum luminance to which reflection characteristics of the printed material onto which the image is projected are applied.

metadata for projection on a print [cd/m$^2$]=target maximum luminance [cd/m$^2$]×1/printed material coefficient    (Formula 1)

The projection metadata generator 208 outputs the metadata for projection on a print to the light source controller 209.

The light source controller 209 controls the light source 210 turning on and off, the light amount of the light source 210, and so on. In the printed material projection mode printed material projection mode, the light source controller 209 controls the light amount of the light source 210 to a value determined by the following Formula 2.

projector light amount [lm]=metadata for projection on a print [cd/m$^2$]×area of printed material [m$^2$]×circle ratio $\pi$    (Formula 2)

The area of the printed material can be identified from the size of the printed material received from the printed material information obtainment circuit 207.

The projector light amount obtained through Formula 2 is a light amount that produces the target maximum luminance. Accordingly, projecting the projection image at this projector light amount makes it possible to set the luminance dynamic range of the printed material to the dynamic range expected by the creator or the user of the projector 102. The projector light amount is determined in consideration of the reflection characteristics of the printed material, and thus the same luminance dynamic range can be realized even if the paper of the printed material has changed, for example. In other words, the light amount control according to this embodiment makes it possible to reduce the effects of different printed material reflection characteristics on the luminance of the printed material illuminated by the projected optical image.

The light source 210 outputs color component light (red light, green light, and blue light) emitted from the three liquid-crystal elements included in the liquid-crystal elements 204. The light source 210 may be a combination of a lamp such as a halogen lamp, a xenon lamp, or a high-pressure mercury lamp and a color filter, or may be LEDs that directly output color component light.

The input devices 211 refers collectively to operating members such as buttons and switches provided in the main body of the projector 102, a remote controller, or the like. The input devices 211 can include, for example, a power button, directional buttons, an OK button, an input switch button, a zoom button, a focus button, a keystone correction button, a menu button, and the like, but is not limited thereto.

Upon detecting the input devices 211 being operated, for example, the main controller 200 executes processing in accordance with the detected operation. For example, if the menu button being operated has been detected, GUI data for a menu screen is read out from the ROM and output to the image processor 202. The image processor 202 combines the menu screen with the image output to the liquid-crystal controller 203 so that the menu screen is displayed overlapping the image, and outputs the combined images to the liquid-crystal controller 203.

By operating the keys and buttons in the input devices 211 and operating the menu screen, the user can change various settings, instruct processed to be executed, and so on. "Changing settings" includes changing operating modes, changing the printed material information used in the printed material projection mode, setting the HDR metadata directly, and so on.

Figure 6:
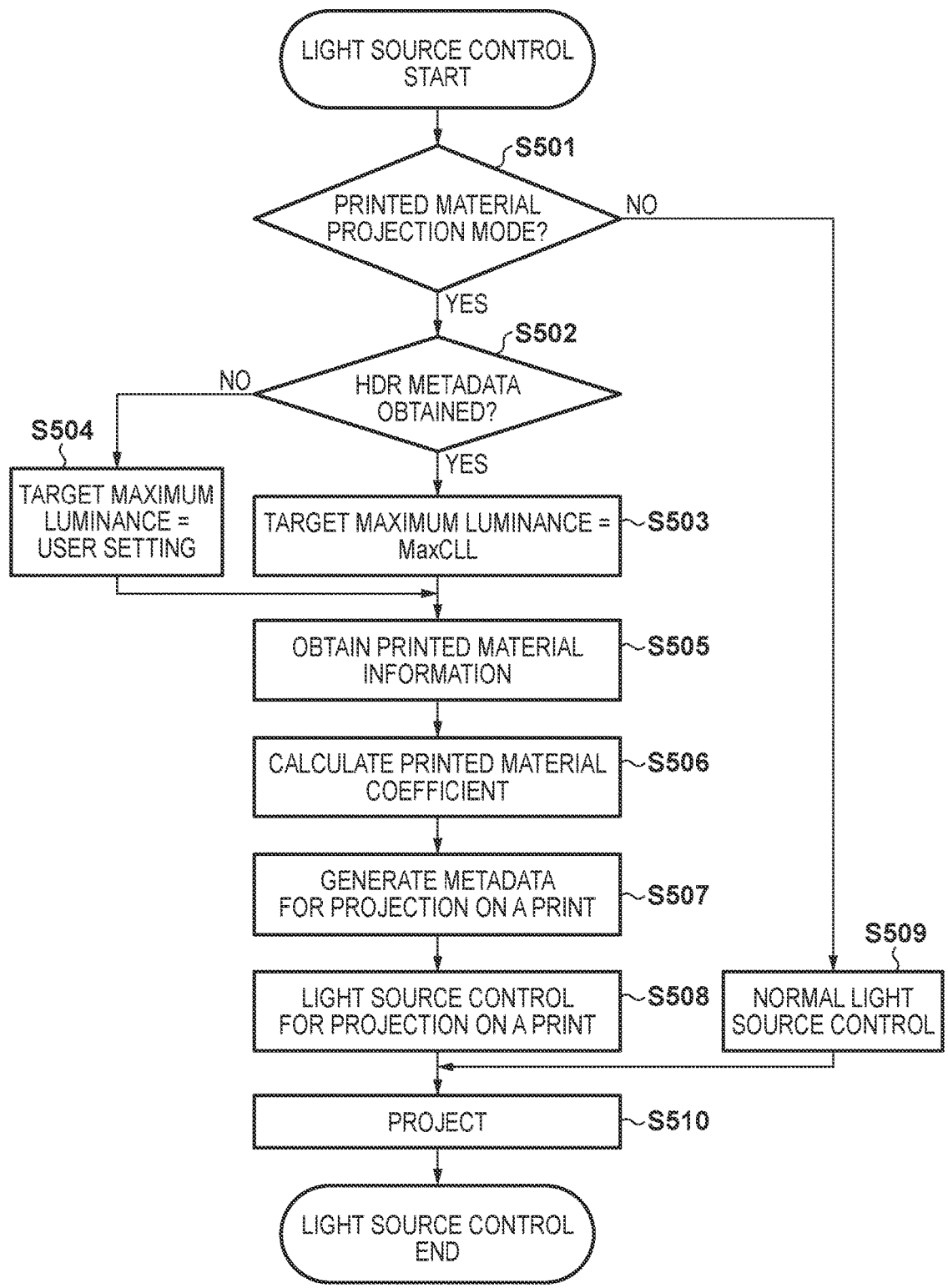
FIG. 6 is a flowchart pertaining to light source control operations according to the first embodiment.

Light source control operations of the projector 102 will be described next using the flowchart in FIG. 6, with particular attention given to operations when projecting onto a printed material. The operations illustrated in the flowchart of FIG. 6 are executed by the programmable processor of the main controller 200 loading a program stored in the ROM into the RAM and executing the program.

In S501, the main controller 200 determines whether or not the printed material projection mode is set by, for example, referring to current setting values stored in the ROM. If the printed material projection mode is set, the process moves to S502; if not, the process moves to S509.

In S509, the main controller 200 causes the light source controller 209 to carry out normal light source control (that is, control not in the printed material projection mode), and then moves the process to S510. Note that conventional processing can be used for the normal light source control, and thus details thereof will not be described here.

In S502, the main controller 200 determines whether or not the metadata obtainment circuit 206 has obtained the HDR metadata from the projected image received by the image input I/F 201. If the HDR metadata has been obtained, the process moves to S503; if not, the process moves to S504.

In S503, the main controller 200 causes the metadata obtainment circuit 206 to determine the target maximum luminance on the basis of the HDR metadata (MaxCLL, here), and then moves the process to S505.

In S504, the main controller 200 causes the metadata obtainment circuit 206 to determine the target maximum luminance on the basis of, for example, a user-set value stored in the ROM, and then moves the process to S505. In S504, the main controller 200 may prompt the user to make the setting by displaying a menu screen for setting the target maximum luminance as an OSD. The main controller 200 then supplies the value set by the user to the metadata obtainment circuit 206, and causes the target maximum luminance to be determined on the basis of that value.

In S505, the main controller 200 causes the printed material information obtainment circuit 207 to obtain the printed material information.

In S506, the main controller 200 causes the printed material information obtainment circuit 207 to obtain the printed material coefficient on the basis of the obtained printed material information.

In S507, the main controller 200 causes the projection metadata generator 208 to generate the metadata for projection on a print.

In S508, the main controller 200 causes the light source controller 209 to carry out light source control based on the metadata for projection on a print and the size of the printed material.

In S510, the main controller 200 irradiates the liquid-crystal elements 204 using the light source 210 as per the control of S508 or S509, and projects the projection image through the projection circuit 205.

Thus according to this embodiment, when projecting an image onto a printed material, the projection light amount is determined in consideration of characteristics pertaining to the reflectance of the printed material. As such, even if papers with different reflectances are used, the same luminance dynamic range can be obtained as long as the same image has been printed. Furthermore, if an instruction has been made with respect to the luminance of the projection image, determining the projection light amount so as to achieve the instructed luminance makes it possible to achieve the luminance dynamic range intended by the creator of the projection image or the user of the projector.

Variation

Although the foregoing embodiment describes the printed material information as being values set through the input devices 211, the printed material information may be obtained from the PC 101. Alternatively, the printed material information may be extracted from a captured image of the printed material as disclosed in Japanese Patent Laid-Open No. 2008-83180, for example.

Figure 7:
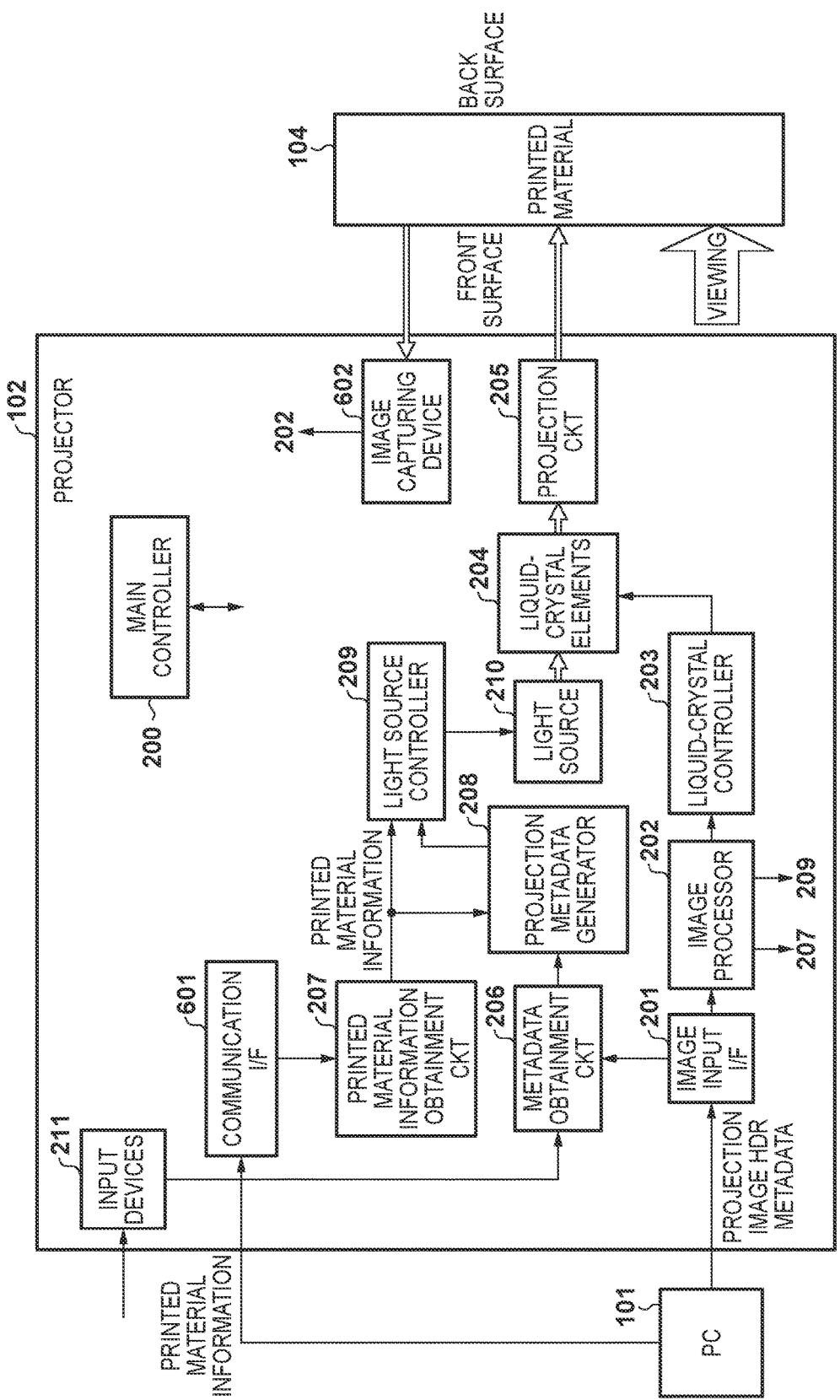
FIG. 7 is a block diagram illustrating a projector according to a variation on the first embodiment.

FIG. 7 is a diagram illustrating an example of the functional configuration of the projector 102 according to a variation on the first embodiment. Constituent elements that are the same as those in FIG. 3 are given the same reference numerals. As illustrated in FIG. 7, the projector 102 includes a communication I/F 601 for communicating with the PC 101 through a different channel from the image input I/F 201.

The communication I/F 601 is an interface for communicating with the PC 101 over a wire or wirelessly. The PC 101 sends the printed material information (the paper type, the ink type, the size of the printed material, contrast information, and so on) to the projector 102 when the sending of the projection image starts, for example. The main controller 200 monitors the communication I/F 601, and when the communication I/F 601 receives the printed material information from the PC 101, the received printed material information is output to the printed material information obtainment circuit 207. The PC 101 may send the printed material information repeatedly while sending the projection image.

The projector 102 illustrated in FIG. 7 further includes an image capturing device 602 that captures an image in the projection direction. The image capturing device 602 captures an image in response to an instruction from the main controller 200, and outputs the captured image to the image processor 202. The image processor 202 determines whether or not a printed material is present on the basis of the captured image. For example, the image processor 202 can determine that a printed material is present if edges corresponding to the size of the paper has been detected from the captured image. If a printed material is determined to be present, the image processor 202 can automatically set the printed material projection mode, notify the light source controller 209 that the mode is the printed material projection mode, and so on.

The image processor 202 can also extract printed material information embedded or printed in the captured image as a watermark and output that information to the printed material information obtainment circuit 207.

Furthermore, although the foregoing embodiment mainly describes luminance control, the same type of control can also be carried out with respect to color. For example, the metadata obtainment circuit 206, which serves as the target obtainment means, obtains a color temperature target value for a white point from metadata or a user-set value. The light source controller 209 may then control the balance of the luminance of the color component lights from the light source 210 so that white pixels of the projection image match the color temperature target value.

Specifically, a table in which color temperature target values for white points and color component light intensity ratios are associated may be prepared in advance, and the light source controller 209 may control the light source 210 so as to achieve an intensity ratio corresponding to the designated color temperature target value.

Figure 3:
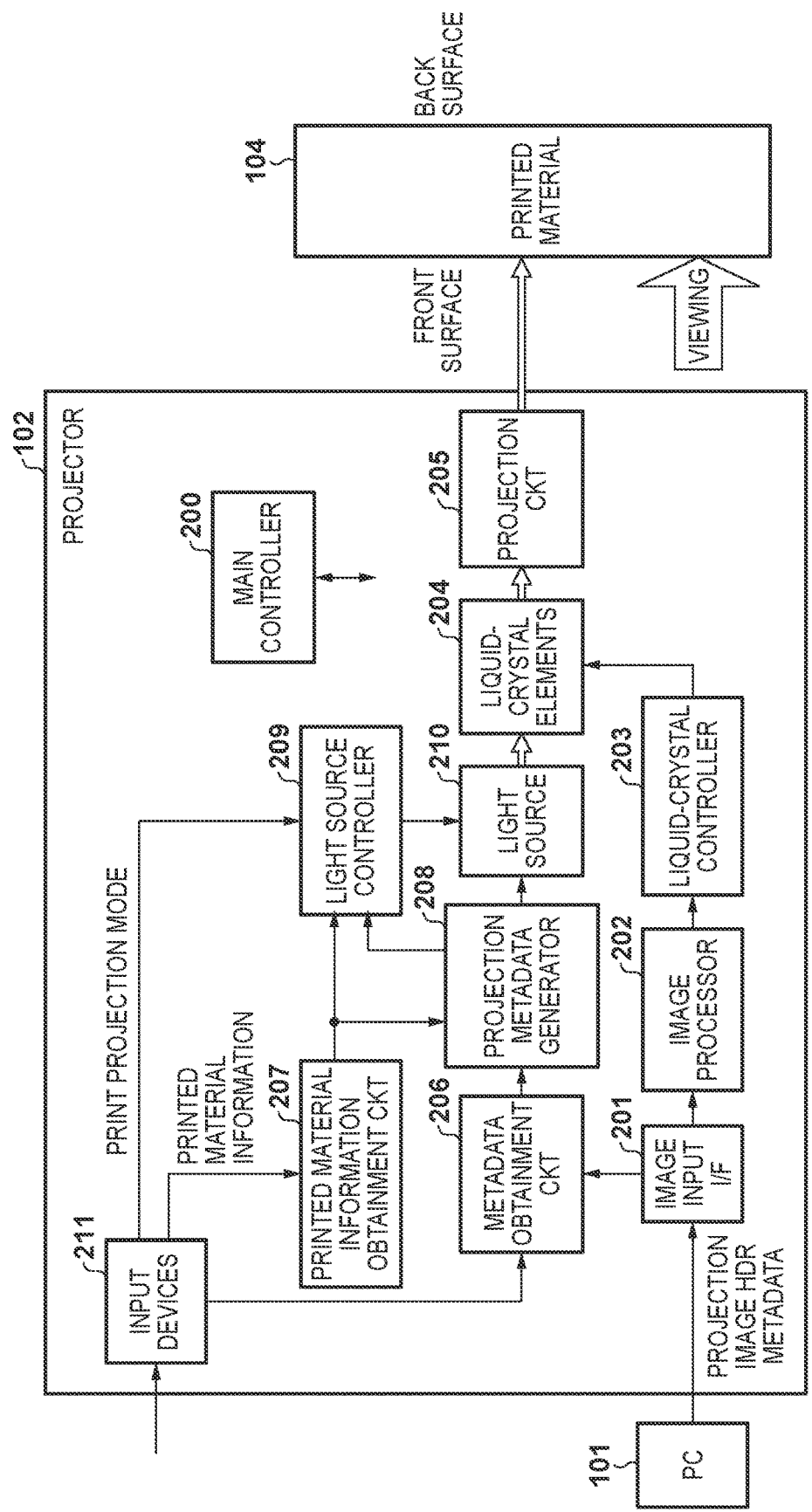
FIG. 3 is a block diagram illustrating a projector according to the first embodiment.

Although FIG. 7 is described as having a different configuration from that illustrated in FIG. 3 to clarify the features of the variation, the communication I/F 601 and the image capturing device 602 may instead be added to the configuration of FIG. 3 to implement the same operations as those of the variation.

Second Embodiment

A second embodiment of the invention will be described next. The first embodiment describes a configuration in which an image is projected onto the front surface (the printing surface) of a printed material. However, the second embodiment describes a configuration in which the printed material is illuminated from the back surface of the printed material.

Figure 8:
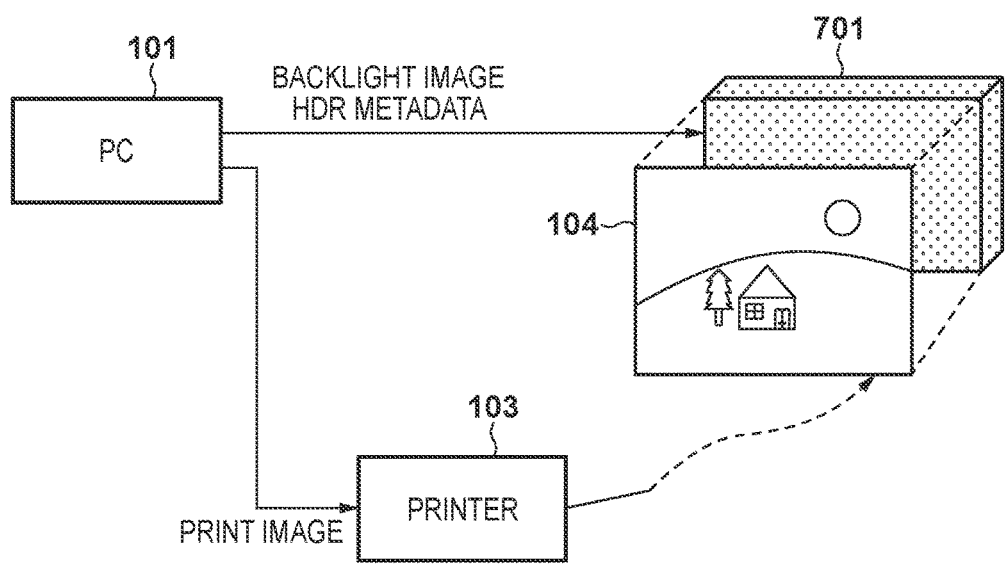
FIG. 8 is a schematic diagram illustrating the configuration of a display system according to a second embodiment.

FIG. 8 is a schematic diagram illustrating an example of the configuration of a display system according to this embodiment. Configurations identical to those in FIG. 1 are given the same reference numerals.

In this embodiment, the PC 101 generates a backlight image (a video signal having a prescribed framerate) and a print image on the basis of the same image data, and sends the backlight image to a backlight device 701 and the print image to the printer 103. The PC 101 also generates the HDR metadata and sends that data to the backlight device 701. The HDR metadata may be included in the image data in advance, or may be set by the user.

The backlight device 701 is a surface light source having a configuration enabling the luminance to be controlled in prescribed area units. The backlight device 701 may be configured with light-emitting elements such as LEDs arranged in a matrix, for example, or may be configured as a combination of a surface light source and an LCD in which transmissivities can be controlled on a pixel-by-pixel basis. The printed material 104 can be affixed to the front surface of the backlight device 701 (a light emission surface). The method for affixing the printed material is not particularly limited. A member that supports the corners or edges of the printed material may be provided on the backlight device 701, or the printed material may be affixed to the backlight device 701 by holding at least part of the printed material against the backlight device 701 using another member. Whether or not a printed material is affixed can also be detected using a photodetector, a sensor that detects reflected light when the printed material is affixed, a switch that mechanically senses when the printed material is affixed, or the like.

Figure 9:
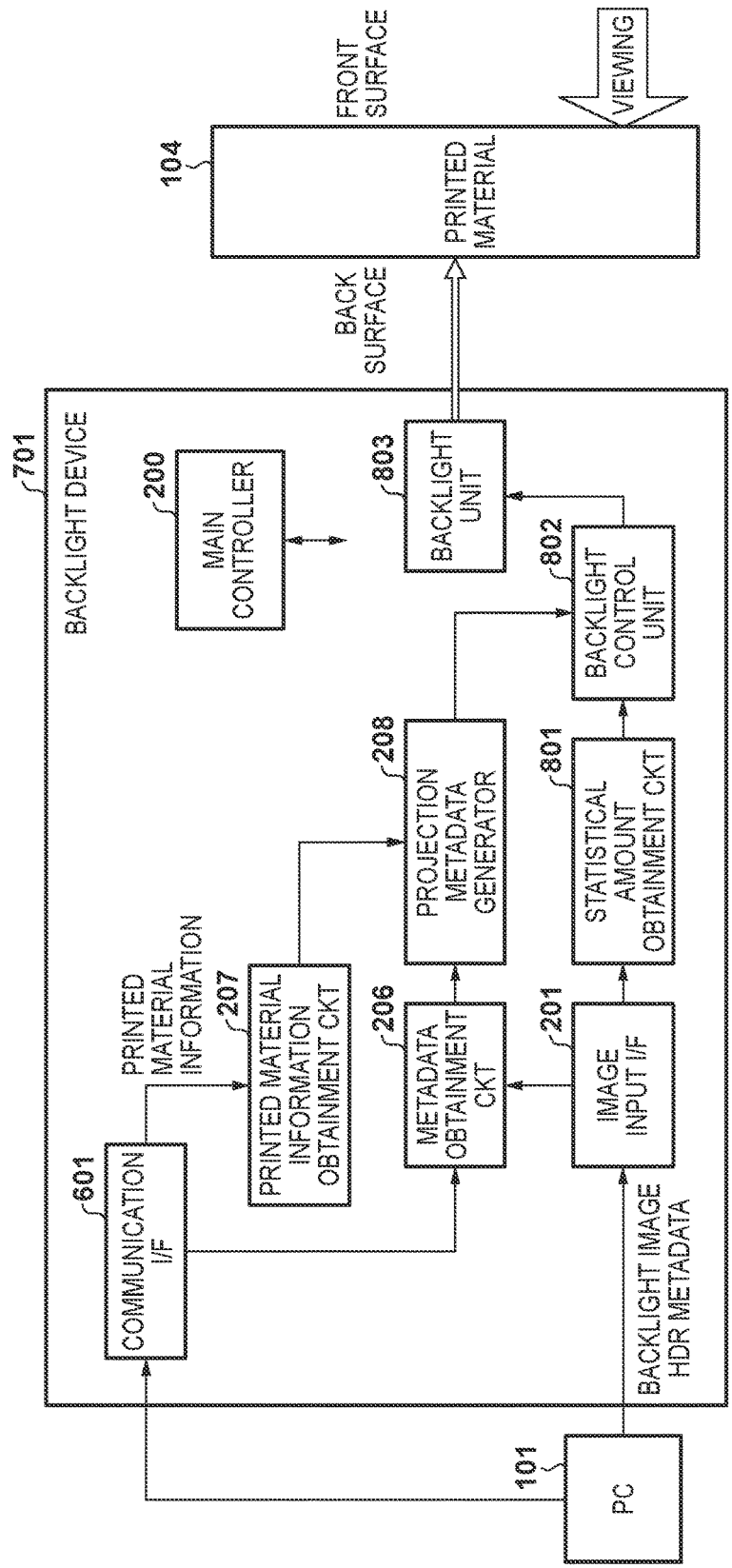
FIG. 9 is a block diagram illustrating a backlight device according to the second embodiment.

FIG. 9 is a diagram illustrating an example of the functional configuration of the backlight device 701 according to this embodiment. Configurations that are the same as those in the projector 102 of the first embodiment are given the same reference numerals as in FIG. 3 or FIG. 7, and descriptions thereof will not be repeated.

The PC 101 sends the backlight image and the HDR metadata to the image input I/F 201. The backlight device 701 of this embodiment does not have a display unit, and thus settings pertaining to the backlight device 701 are made from the PC 101 through the communication I/F 601.

As in the first embodiment, the printed material information obtainment circuit 207 obtains the printed material coefficient by referring to a table on the basis of the printed material information obtained from the PC 101. However, in this embodiment, light transmitted through the printed material is observed. As such, the printed material coefficients, which are information of the optical characteristics of the printed material, are coefficients pertaining to the transmission, rather than the reflection, of light.

FIG. 4B illustrates an example of printed material coefficients based on paper type. With respect to transmission, a higher value for the printed material coefficient indicates a higher light transmissivity. Thus in the example illustrated in FIG. 4B, paper D has a higher light transmissivity than paper F.

Figure 5B:
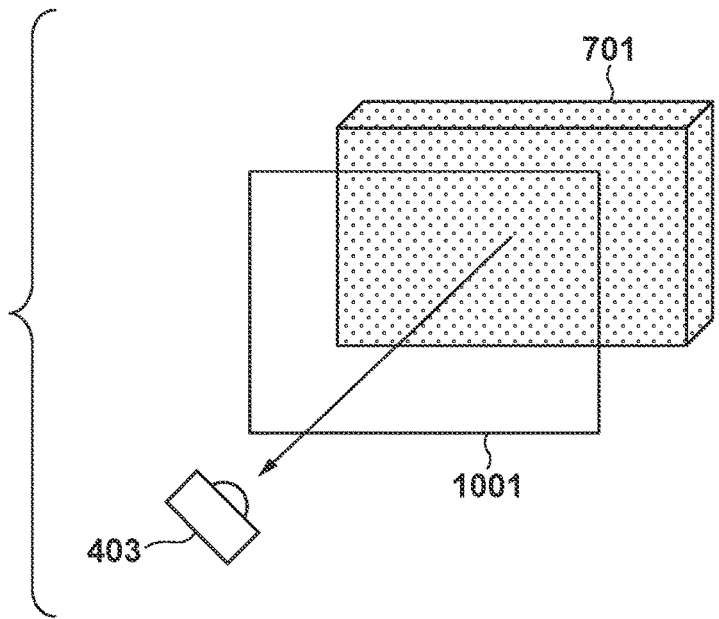

The values of the printed material coefficients pertaining to transmission, too, can be determined in accordance with actually-measured values. For example, as illustrated in FIG. 5B, if the printed material coefficients are based on the paper type, (blank) paper 1001 to be measured is affixed to the front surface of the backlight device 701, and the luminance meter 403 is placed at a prescribed distance in front of the paper 1001. The luminance is then measured by the luminance meter 403 with the backlight device 701 at maximum luminance, for example. The printed material information obtainment circuit 207 determines the printed material coefficient from the measured luminance and the luminance of the backlight device 701, according to the following Formula 3.

$$\text{printed material coefficient} = \text{measured luminance [cd/m}^2\text{]/backlight luminance [cd/m}^2\text{]} \quad \text{(Formula 3)}$$

Although FIGS. 8 and 5B depict the printed material 104 and the paper 1001 as being distanced from the backlight device 701, in actuality, the distance between the light emission surface of the backlight device 701 and the printed material 104 or paper 1001 is substantially zero.

The printed material coefficients pertaining to transmission can also be set in advance in accordance with combinations of multiple types of printed material information. Print modes such as double-sided printing, sepia tone printing, black-and-white printing, and so on can be given as examples of printed material information unique to printed material coefficients pertaining to transmission. As such, printed material coefficients based on the print mode can be set in advance.

The projection metadata generator 208 generates the metadata for projection on a print according to Formula 1, in the same manner as in the first embodiment. In this embodiment, too, MaxCLL (or a different value set from the PC 101) can be used as the target maximum luminance.

A statistical amount obtainment circuit 801 calculates a statistical amount for each of division areas in the backlight image received from the image input I/F 201. Here, the statistical amount obtainment circuit 801 divides the backlight image so as to correspond to units (blocks) for which the luminance of the backlight device 701 is to be controlled, and calculates a prescribed statistical amount for each of the resulting division areas. It is assumed that the statistical amount obtainment circuit 801 finds a maximum value for the color components of the pixels in the division area as the statistical amount. The statistical amount obtainment circuit 801 outputs the maximum value that has been found to a backlight controller 802.

The backlight controller 802 determines the luminance of the backlight device 701 on a block-by-block basis on the basis of the statistical amounts calculated by the statistical amount obtainment circuit 801. For example, for each block in the backlight device 701, the backlight controller 802 determines the magnitude of the luminance corresponding to the maximum value of the color components within the corresponding division area by, for example, referring to a lookup table.

Figure 10:
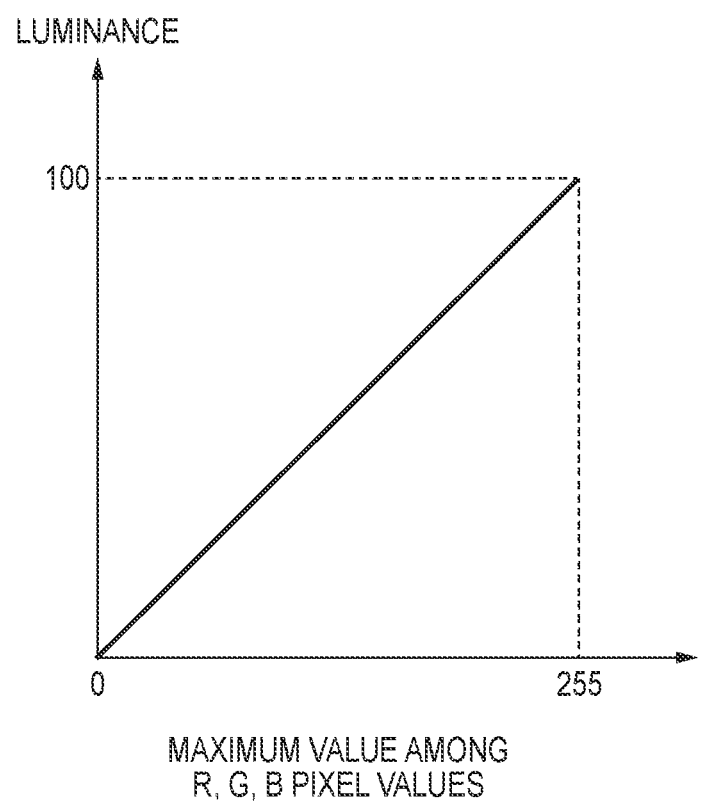
FIG. 10 is a diagram illustrating an example of a lookup table according to the second embodiment.

FIG. 10 illustrates an example of an input/output relationship in the lookup table. Although a relationship in which the luminance increases in a linear manner with respect to the maximum value of the color components is indicated here, the relationship may be such that the output increases in a nonlinear manner with respect to the input. A luminance of 0 corresponds to being unlit, whereas a luminance of 100 corresponds to the maximum luminance. If the input/output relationship can be expressed by a numerical formula, the backlight controller 802 may find the magnitude of the luminance by substituting the maximum value of the color components in the numerical formula.

The backlight controller 802 controls the luminance of a backlight unit 803 so that the luminance 100 of the backlight device 701 matches the metadata for projection on a print generated by the projection metadata generator 208. This relationship is expressed through the following Formula 4.

$$\text{backlight maximum luminance [cd/m}^2\text{]} = \text{metadata for projection on a print [cd/m}^2\text{]} \quad \text{(Formula 4)}$$

The backlight controller 802 first determines the luminance for each block as a value from 0 to 100. The backlight controller 802 then converts each of the determined values into actual luminance so that the luminance 100 becomes the luminance set by the metadata for projection on a print. The backlight controller 802 outputs the luminance found for each block to the backlight unit 803.

The backlight unit 803 is constituted by a light source, a control circuit that controls the luminance of the light source, and an optical unit for diffusing light. As described above, the luminance of the backlight device 701 can be controlled on a block-by-block basis. Here, it is assumed that the light emission surface of the backlight device 701 is divided into m horizontal blocks×n vertical blocks (where m and n are integers). The backlight unit 803 controls the luminance of the light source on the basis of the block-by-block luminance received from the backlight controller 802. Note that the backlight luminance control may involve controlling the brightness of the light source itself, or may involve controlling the transmissivity of transmissive liquid-crystal elements that receive light from the light source.

Thus according to this embodiment, when projecting light from the back surface of a printed material, the projection light amount is determined in consideration of characteristics pertaining to the transmissivity of the printed material. As such, even if papers with different transmissivities are used, the same luminance dynamic range can be obtained as long as the same image has been printed. Additionally, by controlling the projection light amount on an area-by-area basis in accordance with pixel values of the backlight image, the projection light amount can be controlled precisely in accordance with parts where the luminance is to be increased and parts where the luminance is not to be increased.

Furthermore, if an instruction has been made with respect to the target maximum luminance, determining the projection light amount so as to achieve the instructed luminance makes it possible to achieve the luminance dynamic range intended by the creator of the image printed onto the printed material or the user.

Although the foregoing embodiment describes a configuration in which the luminance of the backlight device is controlled on an area-by-area basis, the entire surface of the backlight device may instead be constantly kept at a maximum luminance, and printing may be carried out in consideration of the transmissivity of the paper. For example, print data can be controlled so that less ink is used in parts where the luminance is to be increased and more ink is used in parts where the luminance is to be reduced.

Third Embodiment

A third embodiment of the invention will be described next. This embodiment pertains to a display system in which the configurations described in the first and second embodiments are connected over a network.

Figure 11:
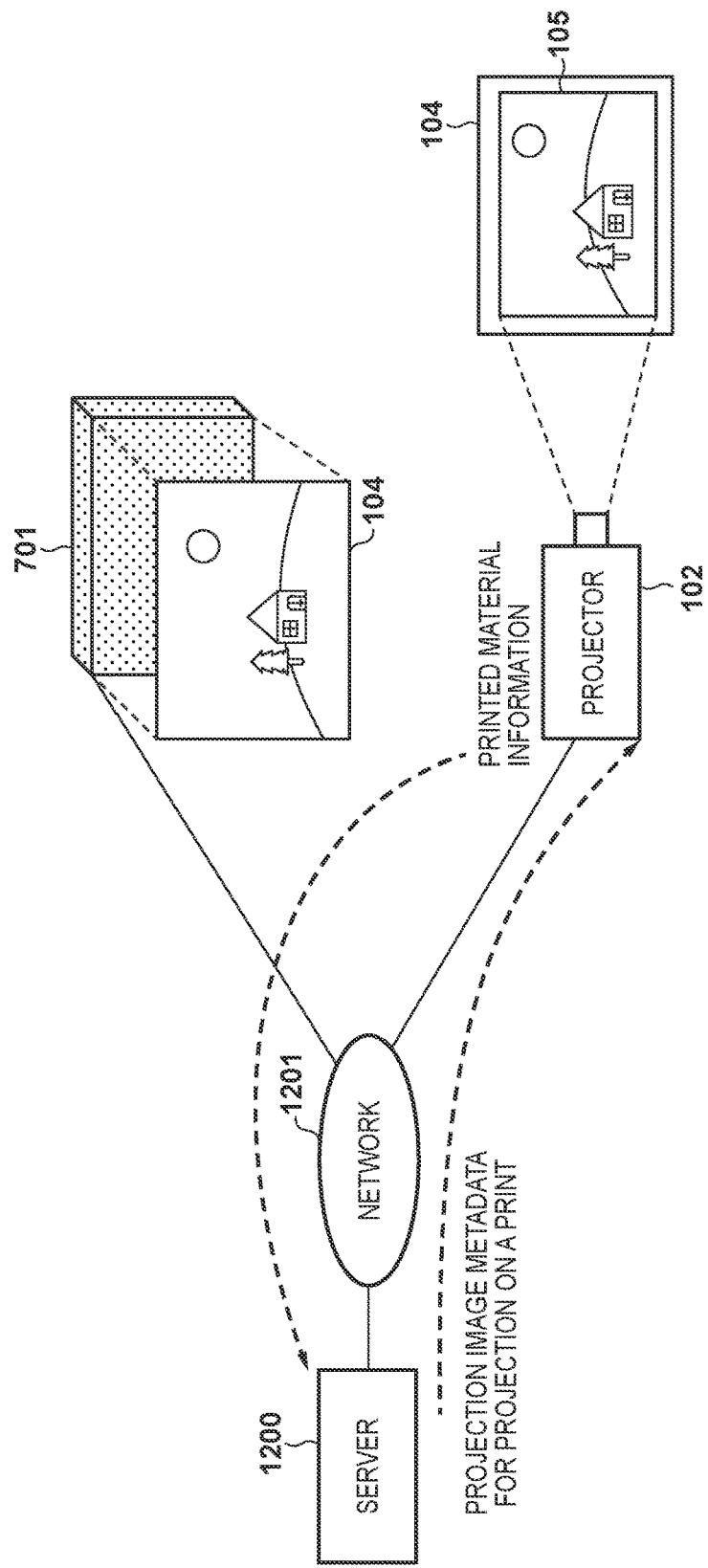
FIG. 11 is a schematic diagram illustrating the configuration of a display system according to a third embodiment.

FIG. 11 is a schematic diagram illustrating an example of the configuration of a display system according to this embodiment. Configurations identical to those in FIGS. 1, 7, and 8 are given the same reference numerals.

In this embodiment, an image delivery server 1200 is used instead of the PC 101, and the projector 102, the backlight device 701, and the image delivery server 1200 are connected to a shared network 1201. The network 1201 may be a public network such as the Internet, or maybe a private network such as a local area network.

First, although FIG. 11 illustrates one each of the projector 102 and the backlight device 701 being connected to the shared network 1201, a plurality of these devices may be connected. In the following, the projector 102 and the backlight device 701 will be referred to as "terminal devices" when there is no need to distinguish between the two. Furthermore, although the PC 101 is not used in the example illustrated in FIG. 11, the PC 101 may be connected between the shared network 1201 and the projector 102 or the shared network 1201 and the backlight device 701 to relay communication.

The configuration of the image delivery server 1200 may be the same as the PC 101, and the operations described below can be implemented by the CPU 110 executing a server application. The storage device 113 stores projection images, backlight images, and so on in database form. The projection image and backlight image used for a given image may be the same image or different images. Additionally, the backlight image may be luminance information only. The image delivery server 1200 sends an image requested by the terminal device connected to the shared network 1201. Note that the image delivery server 1200 and the terminal device are assumed to have communication functions compliant with the communication protocol of the shared network 1201, and thus the communication will not be described in detail.

The request sent from the terminal device to the image delivery server 1200 includes information specifying (an image in) a printed material, information specifying the type of the terminal device (or whether the projection surface is the printing surface or the back surface), and the printed material information. This information can be designated by the user through an input device provided in the terminal device. The information specifying the image, for example, can be printed as small text on the printed material and can then be input by the user through the input device of the terminal device. If the terminal device includes a camera, a captured image of the printed material may be sent from the terminal device to the server, and the printed material may then be specified by the image delivery server 1200. Alternatively, when the PC 101 connected to the terminal device relays the request to the server, the information specifying the printed material, the printed material information, and so on may be added to the request. If the printed material to be handled by the terminal device does not change, the image delivery server 1200 can store information indicating the association between the terminal device and the image.

Figure 12:
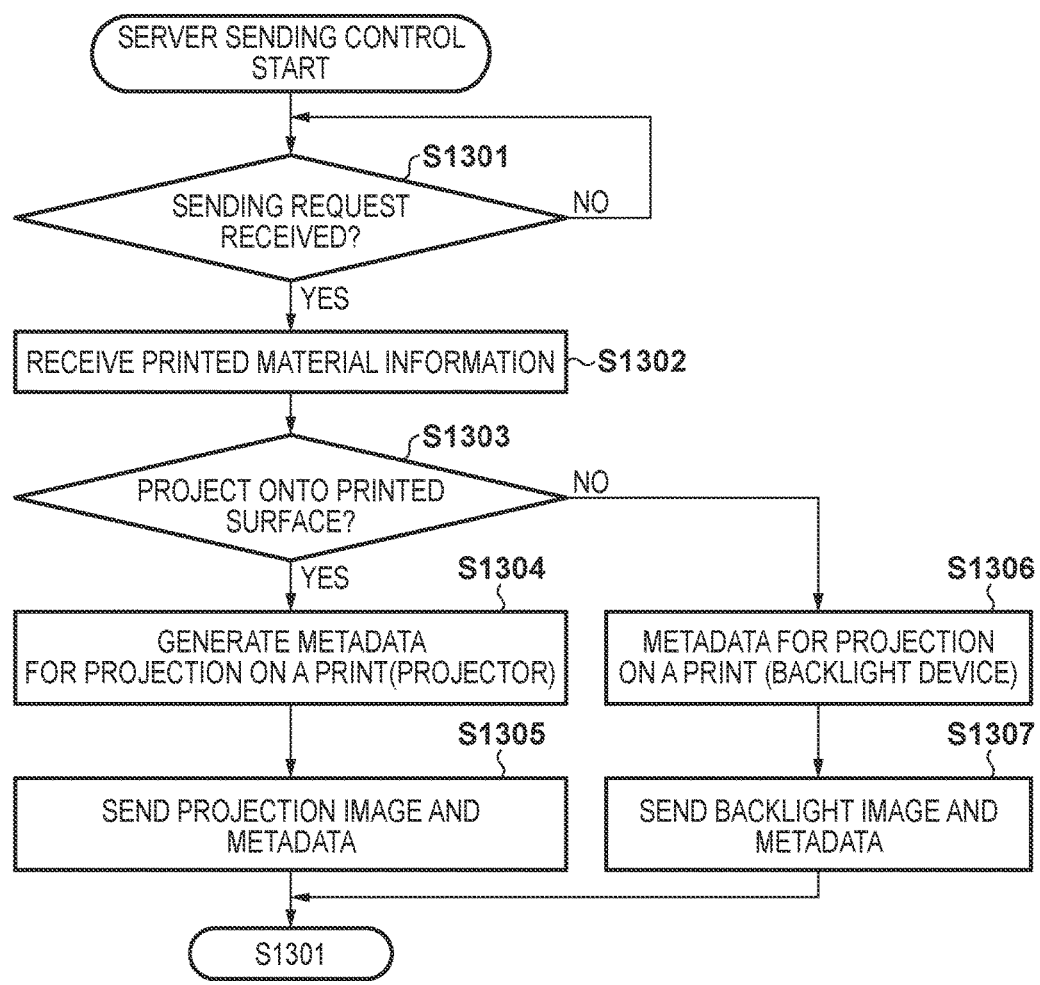
FIG. 12 is a flowchart pertaining to server operations according to the third embodiment.

Operations of the image delivery server 1200 will be described using the flowchart in FIG. 12.

In S1301, the CPU 110 determines whether or not a sending request has been received through the I/F 114. If it is determined that the request has been received, the process moves to S1302; if not, S1301 is repeated.

In S1302, the CPU 110 receives, from the device that is the source of the request (the terminal device or PC), the printed material information, the information specifying the type of the terminal device (or whether the projection surface is the printing surface or the back surface), and the information specifying (the image in) the printed material.

In S1303, the CPU 110 determines, on the basis of the received information, whether or not the request is for an image to be used in projection onto the printing surface. If it is determined that the request is for an image to be used in projection onto the printing surface, the process moves to S1304; if not, the process moves to S1306.

The image delivery server 1200 holds, in, for example, the storage device 113, a table for calculating the printed material coefficient with respect to reflectance as described in the first embodiment and a table for calculating the printed material coefficient with respect to transmissivity as described in the second embodiment. In S1304 and S1306, the CPU 110 generates printed material coefficients and metadata for projection on a print for the projector and the backlight device, in the same manner as the printed material information obtainment circuit 207 and the projection metadata generator 208.

In S1305, the CPU 110 sends the projector metadata for projection on a print and projection image to the terminal device that is the source of the request, after which the process returns to S1301.

In S1307, the CPU 110 sends the backlight device metadata for projection on a print and the backlight image to the terminal device that is the source of the request, after which the process returns to S1301.

According to this embodiment, even if both a projector and a backlight device are present on a network, an image delivery server generates the metadata for projection on a print in accordance with the type of the device that is the source of the request, and sends that metadata to that device along with the projection or backlight image. As such, a printed material can be given the luminance dynamic range desired by the creator of the image in the printed material or the user of the device, regardless of whether the device is a projector or a backlight device.

In the above-described first to third embodiments, updating the printed material coefficients makes it possible to control the projection in consideration of the deterioration of the printed material over time. Specifically, the printed material coefficient with respect to reflectance or transmission can be calculated on the basis of a luminance measured after replacing the paper 401 illustrated in FIG. 5A with the printed material. Because the printed material differs from white paper, the printed material coefficient may be calculated by measuring the luminance of a part of the printed material that is not printed onto, using an average value of luminance measured at a plurality of locations, or the like. This is useful when handling a printed material that has been displayed outdoors for a long period of time, for example.

Fourth Embodiment

The first to third embodiments describe a configuration in which a printed material is given a designated luminance dynamic range by controlling the luminance of projection light in accordance with the state of the printed material. In other words, the embodiments describe a configuration that does not control the printed material but does control the projection light.

However, a similar effect can be achieved by controlling the printed material in accordance with the projection light while the projection light remains fixed. This embodiment will describe a configuration in which the output of the printed material is controlled in accordance with the environment where the printed material will be placed.

Figure 13:
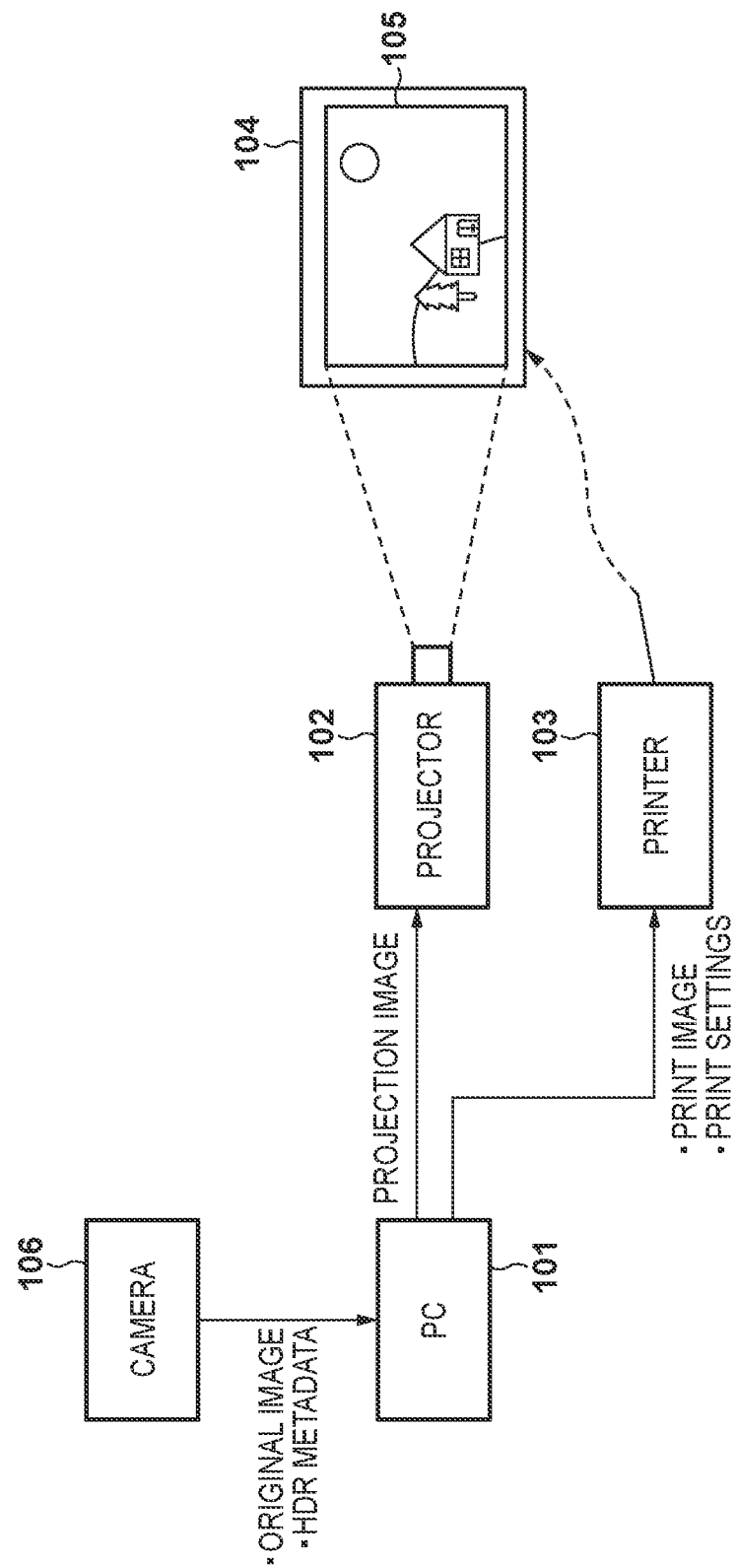
FIG. 13 is a schematic diagram illustrating the configuration of a display system according to a fourth embodiment.

FIG. 13 is a schematic diagram illustrating an example of the configuration of a display system according to this embodiment. Configurations that are the same as in the first embodiment are given the same reference numerals.

A camera 106, which sends the original image for HDR display and the HDR metadata to the PC 101, has been added to the configuration of the first embodiment. Note that the original image and the HDR metadata need not be sent to the PC 101 from the camera 106. The PC 101 may obtain these items from another communication-enabled electronic device, network-attached storage, or the like.

Like the first embodiment, the PC 101 generates a projection image (a video signal having a prescribed framerate) and a print image on the basis of the same original image, and sends the projection image to the projector 102 and the print image to the printer 103. However, in this embodiment, the PC 101 determines print settings in accordance with the target maximum luminance of the original image and the state of the environment in which the printed material is placed, and sends the print settings to the printer 103. The PC 101 may send the determined print settings to a device aside from the printer 103, such as network-attached storage.

Figure 14:
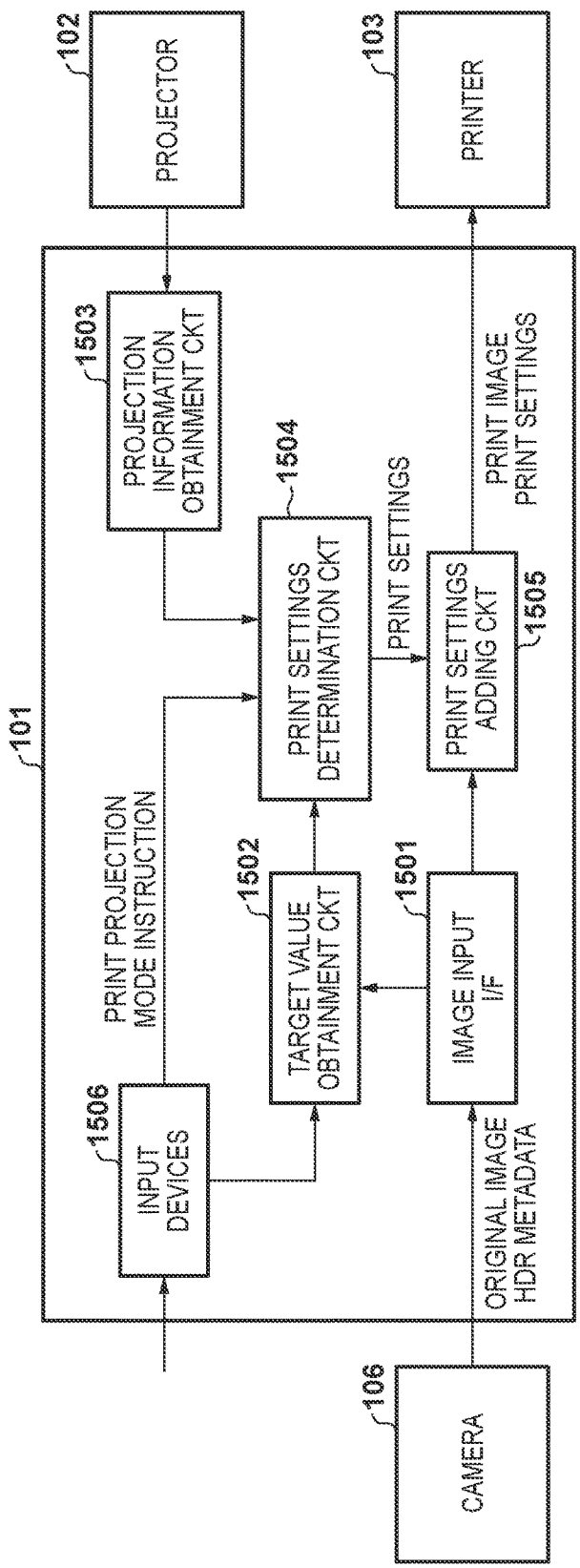
FIG. 14 is a function block diagram illustrating a PC according to the fourth embodiment.

An example of the functional configuration of the PC 101 according to this embodiment will be described next using the block diagram in FIG. 14. In FIG. 14, the CPU 110 is schematically depicted as a function block that realizes functions by executing HDR display application software.

In this embodiment, the PC 101 has a "printed material projection mode" for imparting an HDR effect on the printed material using an auxiliary light source such as image projection or back surface light, and a "normal mode" for normal printing that does not impart the HDR effect, as modes for determining the print settings. These modes are given for the sake of simplicity, and for example, a "printed material projection mode" can be determined when printing from HDR display application software.

An image input I/F 1501 receives the original image and the HDR metadata from an external device such as the camera 106. The image input I/F 1501 may be compliant with one or more standards such as HDMI, DP, and SDI, or may be compliant with a proprietary standard.

A target value obtainment circuit 1502 obtains the HDR metadata (MaxCLL, MaxFALL, or the like) corresponding to the original image input to the image input I/F 1501. Although this embodiment describes the HDR metadata as being attached to the original image that is input, the HDR metadata may be obtained separately from the original image, or setting values may be obtained through input devices 1506.

A projection information obtainment circuit 1503 receives projection information from the projector 102. The "projection information" is information pertaining to the state of the projection surface, which depends on the characteristics of the projection light from the projector 102 and the projection surface. In this embodiment, projection surface luminance information is used as the projection information. The projection surface luminance can be measured in the same manner as illustrated in FIG. 5A. Specifically, the luminance measured when using a standard white board (a perfect diffuser plate) as the paper 401 can be used as the projection surface luminance. Alternatively, if the projector 102 includes a camera, the projector 102 may use the camera as a luminance meter and obtain luminance information of an image obtained by capturing the projection surface as the projection surface luminance.

A print settings determination circuit 1504 determines the print settings, for imparting the HDR effect on the printed material using the projection light, from the target maximum luminance input from the target value obtainment circuit 1502 and the projection information input from the projection information obtainment circuit 1503, when in the printed material projection mode. The "print settings" are the type of the recording medium, the ink type, and so on used for the printed material. A method for determining the print settings will be described hereinafter.

First, the print settings determination circuit 1504 calculates the printed material coefficient with respect to reflectance from the target maximum luminance and the projection information (the projection surface luminance).

Like in the first embodiment, the printed material coefficient is expressed as a value in which the luminance of reflected light, measured when light is projected onto a target printed material, is normalized with the luminance of reflected light when a standard white board is used as the printed material (the projection surface luminance) is taken as 1.0. In other words, the print settings determination circuit 1504 calculates the printed material coefficient according to the following Formula 5.

$$\text{printed material coefficient} = \text{target maximum luminance [cd/m}^2\text{]/projection surface luminance [cd/m}^2\text{]} \quad \text{(Formula 5)}$$

In other words, the printed material coefficient can also be called the reflectance of the recording medium when the reflectance of the standard white board is 1.0.

The print settings determination circuit 1504 determines the type of the recording medium (paper) from the obtained printed material coefficient, on the basis of the table illustrated in FIG. 4A, for example. Although the printed material coefficient is determined from information of the paper in the first embodiment, the paper is determined from the printed material coefficient in this embodiment. Specifically, the print settings determination circuit 1504 determines paper A (matte) when the printed material coefficient is 0.5; paper B (standard), when the printed material coefficient is 0.8; and paper C (glossy), when the printed material coefficient is 1.2. If the paper is determined from the printed material coefficient, the printed material coefficients in the table may have ranges, such as a range of 0.4 to 0.5 for the printed material coefficient indicating the paper A.

Note that the print settings determined in accordance with the printed material coefficient are not limited to the recording medium type. For example, a table in which ink types usable by the printer 103 and printed material coefficients (reflectances) are associated can be prepared in advance, and more detailed print settings can be determined by taking the printed material coefficients based on the ink type into consideration along with the printed material coefficients based on the recording medium type.

Additionally, determining whether or not light-color ink can be used in accordance with the paper type makes it possible to suppress graininess in the printed material and achieve smooth expression. "Light-color ink" is ink having a light color, such as Lm (light magenta), Lc (light cyan), and Lk (light black). Such light-color ink has an effect of suppressing graininess in printed materials, but the amount that can be used differs depending on the paper type. As such, also associating whether or not light-color ink can be used in accordance with the paper type makes it possible to determine print settings that provide a higher-quality printing result.

A print settings adding circuit 1505 adds information of the print settings determined by the print settings determination circuit 1504 to the original image input from the image input I/F 1501, and outputs the result to the printer 103 as the print image.

The input devices 1506 accepts GUI operations through an input device such as a keyboard, a mouse, or a touch panel. In this embodiment, the input devices 1506 is used to explicitly set the printed material projection mode, set the target maximum luminance in cases where the original image does not include HDR metadata, and so on.

Figure 15:
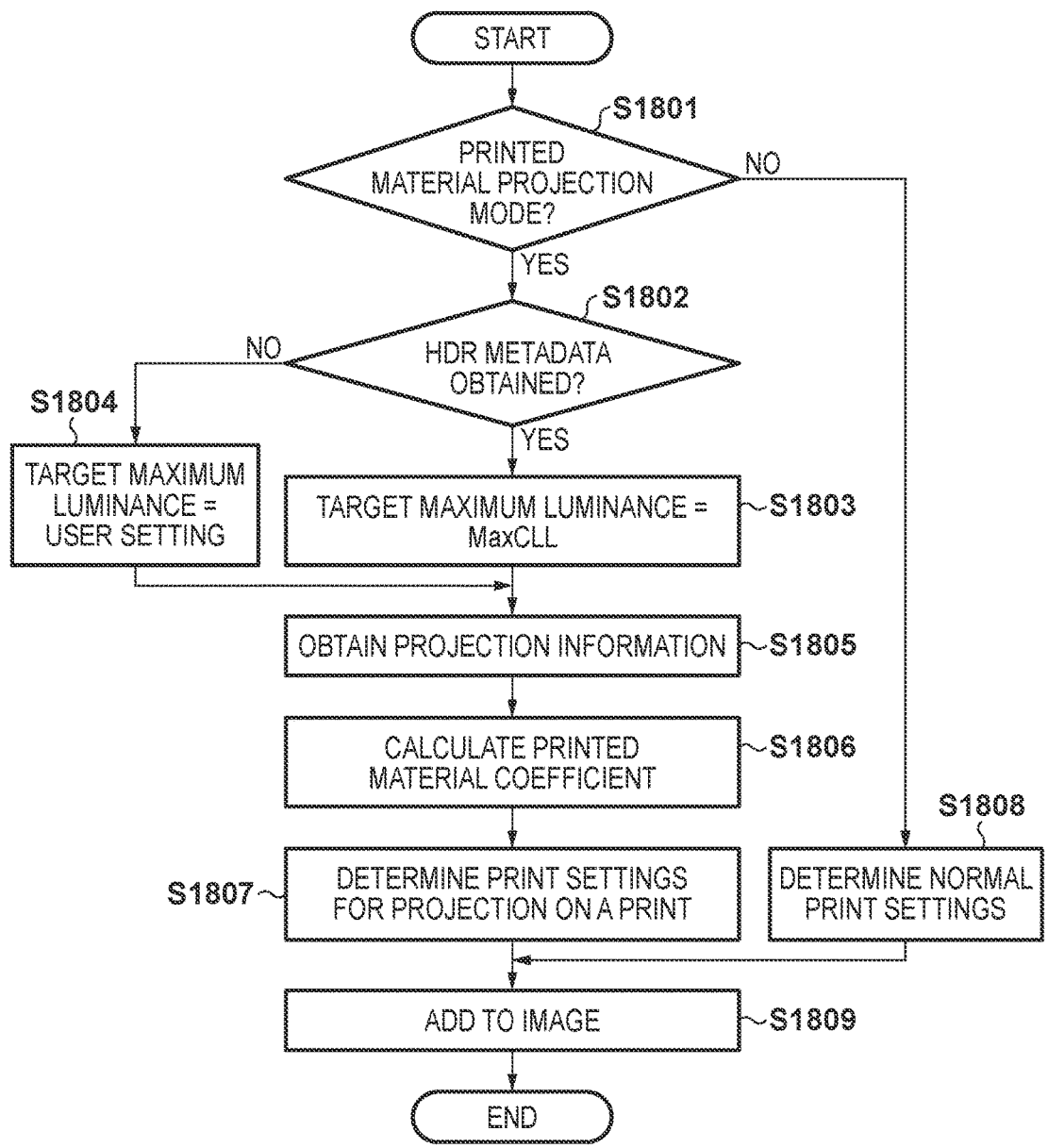
FIG. 15 is a flowchart pertaining to printing configuration determining operations according to the fourth embodiment.

Operations for determining the print settings, carried out by the above-described PC 101, will be described next using the flowchart in FIG. 15. In the following, operations described as being carried out by the function blocks illustrated in FIG. 14 are actually realized by the CPU 110 executing programs. The operations illustrated in FIG. 15 are executed when, for example, a print instruction has been detected from an application running on the PC 101.

In S1801, the CPU 110 determines whether or not the printed material projection mode is set. If it is determined that the printed material projection mode is set, the process moves to S1802; if not, the process moves to S1808. The CPU 110 can determine that the printed material projection mode is set if a print instruction has been made from HDR display application software, if the printed material projection mode has been set explicitly through the input devices 1506, and so on. Alternatively, the CPU 110 may determine that the printed material projection mode is set if the projector 102 is connected to the PC 101.

In S1808, the print settings determination circuit 1504 determines print settings for normal printing (i.e., not in the printed material projection mode), after which the process moves to S1809. Note that conventional processing can be used for determining the normal print settings, and thus details thereof will not be described here.

In S1802, the CPU 110 determines whether or not the target value obtainment circuit 1502 has obtained the HDR metadata from the projected image received by the image input I/F 1501. If it is determined that the HDR metadata has been obtained, the process moves to S1803; if not, the process moves to S1804.

In S1803, the CPU 110 takes the target maximum luminance as the HDR metadata (MaxCLL, here), after which the process moves to S1805.

In S1804, the CPU 110 takes the target maximum luminance as a user-set value, for example, after which the process moves to S1805. In S1804, the CPU 110 may prompt the user to make the setting by displaying a menu screen for setting the target maximum luminance in the display device 115. The CPU 110 then takes the value set by the user as the target maximum luminance.

In S1805, the projection information obtainment circuit 1503 obtains the projection information (the projection surface luminance) from the projector 102. The projection information may, for example, be information measured when the projector 102 is installed and stored in the projector 102.

In S1806, the print settings determination circuit 1504 calculates the printed material coefficient by substituting the target maximum luminance obtained in S1803 or S1804 and the projection surface luminance obtained in S1805 into Formula 5.

In S1807, the print settings determination circuit 1504 determines print settings for projection on a printed matter using the printed material coefficient and the tables illustrated in FIGS. 4A and 4B, and outputs the determined settings to the print settings adding circuit 1505.

In S1809, the print settings adding circuit 1505 adds information of the print settings to the original image supplied from the image input I/F 1501, and outputs the result to the printer 103 as the print image.

As described thus far, according to this embodiment, in a display system that imparts an HDR effect for enhancing the luminance dynamic range of a printed material by projecting an image onto the printed material, the print settings of the printed material are determined in consideration of characteristics pertaining to the reflectance of the projection surface where the printed material is placed. As such, a consistent luminance dynamic range is obtained even if an image is projected using projection light having different characteristics. Additionally, if an instruction as to the luminance of the post-projection printed material has been made, determining the print settings to achieve the instructed luminance makes it possible to achieve the luminance dynamic range intended by the creator of the projection image or the user of the PC.

Like the first embodiment, this embodiment describes a configuration where the projector 102 projects a printing surface onto the printed material, but the print settings can be determined in the same manner even if a backlight device is used, as in the second embodiment. However, as described in the second embodiment, the printed material coefficient is the transmissivity rather than the reflectance.

Although this embodiment mainly describes operations for determining the print settings for achieving the target maximum luminance, with respect to color, too, the print settings can similarly be determined so as to achieve a target value. For example, the color temperature target value of a white point can be designated from metadata or through user settings. Information pertaining to the color temperature of the light source may then be obtained from the projector 102 as projection information, and the balance of print colors may be controlled on the basis of the paper type determined in accordance with the printed material coefficient and the information of the color temperature of the light source so that white in the printed material matches the color temperature target value. For example, the color temperature target value, the paper type, and information pertaining to the balance of print colors can be obtained and stored in advance. The print settings determination circuit then determines the balance of the print color based on the color temperature target, and includes that information in the print settings.

Finally, although this embodiment describes a configuration in which the PC 101 determines the print settings, the print settings may be determined by the printer 103, a communicatively-connected server device, or the like.

Fifth Embodiment

A fifth embodiment of the invention will be described next. In this embodiment, tone values of a print image are controlled in addition to determining the print settings as described in the fourth embodiment.

Figure 16:
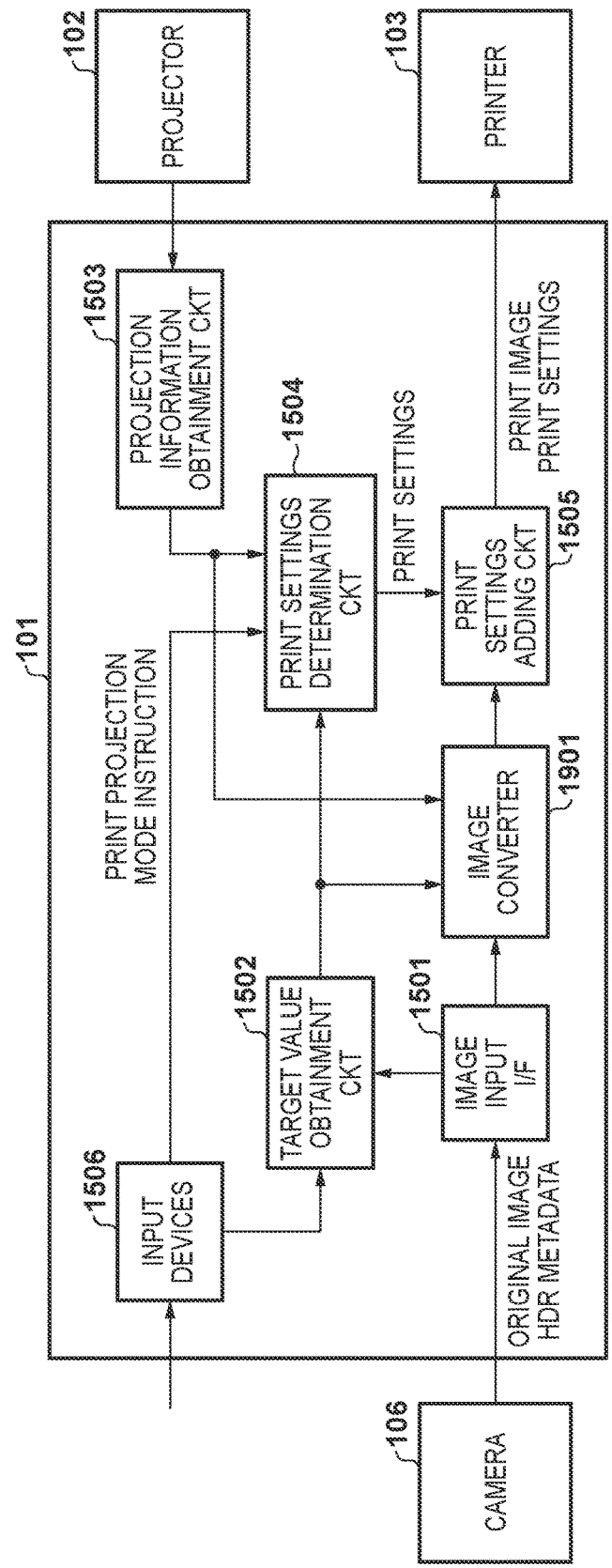
FIG. 16 is a function block diagram illustrating a PC according to a fifth embodiment.

FIG. 16 is a block diagram illustrating an example of the functional configuration of the PC 101 according to this embodiment. Configurations that are the same as in FIG. 14 are given the same reference numerals. An image converter 1901 is included in addition to the functional configuration of the fourth embodiment. Descriptions of operations similar to those in the fourth embodiment will be omitted in the following.

In this embodiment, the HDR metadata of the original image includes tone conversion information, and the target value obtainment circuit 1502 obtains the tone conversion information from the HDR metadata. However, the tone conversion information may be obtained separately from the HDR metadata, or may be obtained as setting values through the input devices 1506.

The target value obtainment circuit 1502 outputs the obtained tone conversion information to the image converter 1901.

Figure 17A:
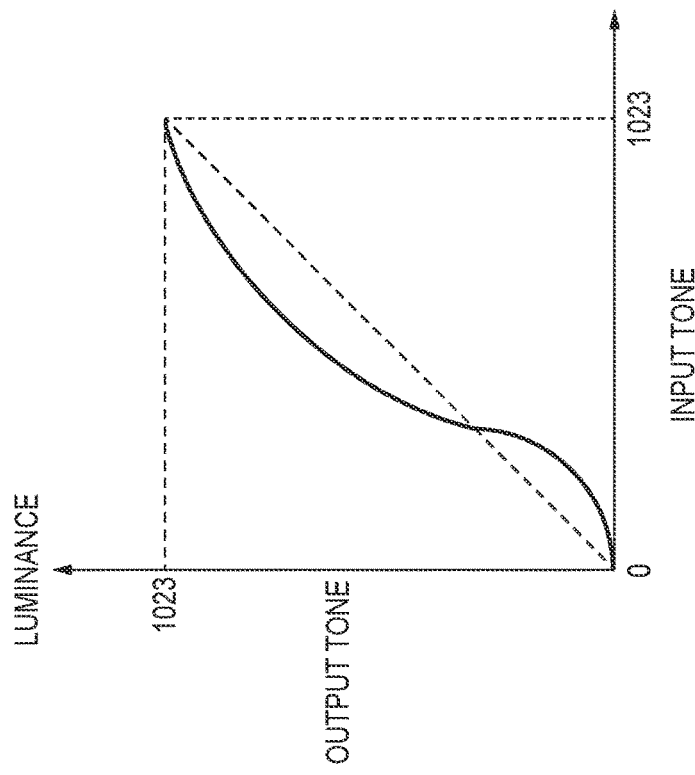
FIGS. 17A and 17B are graphs illustrating examples of tone conversion information according to the fifth embodiment.
Figure 17B:
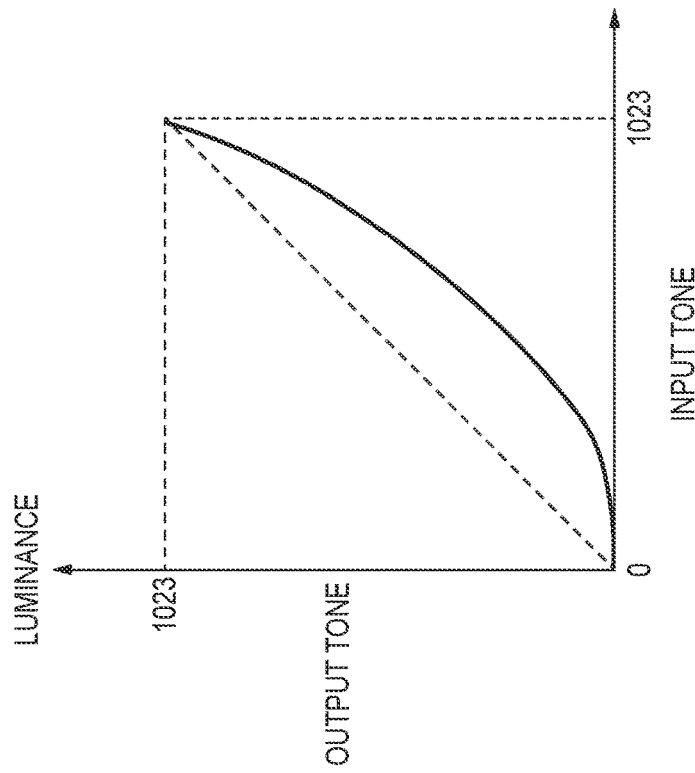

The image converter 1901 applies tone conversion to the original image in accordance with the tone conversion information. FIGS. 17A and 17B illustrate examples of tone conversion information, when the original image is in a format in which the luminance (tones) of pixels are expressed in 1024 levels (10 bits), as input/output characteristics in a coordinate system where the horizontal axis represents input tone values and the vertical axis represents output tone values. These characteristics may actually be expressed as a table or a numerical formula.

Here, FIG. 17A illustrates tone conversion information for characteristics in which the image as a whole is made darker. FIG. 17B illustrates tone conversion information for characteristics in which pixels having tones less than or equal to a predetermined threshold (low tones) are made darker and pixels having tones greater than the threshold (high tones) are made brighter. Tone conversion that makes low-tone pixels darker makes it possible to reduce bright blacks in the printed material caused by ambient light illuminating the printed material (including projection light from the projector 102 or the backlight device 701).

Tone conversion operations according to this embodiment will be described using the flowchart in FIG. 18.

Figure 18:
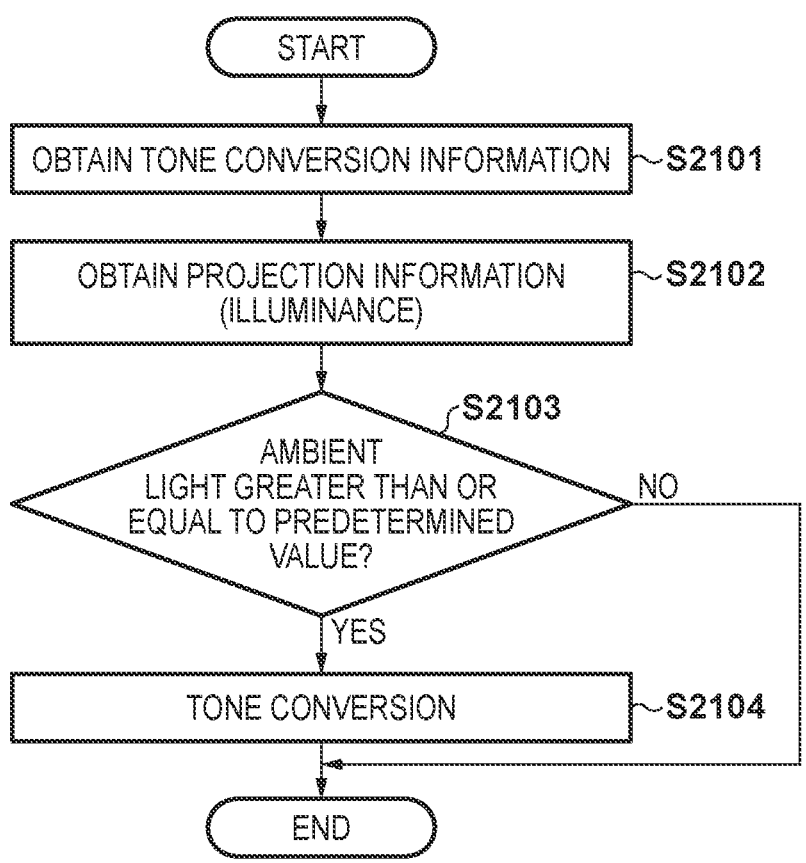
FIG. 18 is a flowchart pertaining to tone conversion operations according to the fifth embodiment.

Note that the flowchart in FIG. 18 is carried out in the printed material projection mode, and thus processes for transitioning to the printed material projection mode, processes carried out when not in the printed material projection mode, and so on will not be described. In the following, operations described as being carried out by the function blocks illustrated in FIG. 16 are actually realized by the CPU 110 executing programs.

In S2101, the target value obtainment circuit 1502 obtains the tone conversion information from the HDR metadata or through the input devices 1506.

In S2102, the projection information obtainment circuit 1503 obtains ambient light information as the projection information. Here, the ambient light information is information pertaining to the brightness (illumination level) of the location where the printed material is placed, and may be illuminance [lx], for example. The ambient light information may be measured in advance at the location where the printed material is placed. Alternatively, if the projector 102 includes a camera, the ambient light information may be obtained from luminance information of a location where the printed material is placed, and then supplied to the projection information obtainment circuit 1503.

In S2103, the projection information obtainment circuit 1503 determines whether or not the ambient light information (illuminance) obtained in S2102 is greater than or equal to a predetermined value set in advance. If it is determined that the information is greater than or equal to the predetermined value, the process moves to S2104; if not, the process ends without applying tone conversion.

In S2104, the image converter 1901 applies a tone conversion process to the original image using the obtained tone conversion information, after which the process ends.

Note that the operations illustrated in FIG. 18 can be executed on each frame of the original image input from the image input I/F 1501, for example.

This embodiment describes an example in which the brightness of the location (the projection surface) where the printed material is placed is obtained as the ambient light information, and tone conversion that darkens at least low-tone pixels in the image is applied if the brightness is greater than or equal to a predetermined value. However, other conditions or tone conversion characteristics can be used instead. Furthermore, although whether or not to apply the tone conversion process is determined in accordance with the brightness of the location where the printed material is placed, the configuration may be such that if the tone conversion information has been obtained, the tone conversion is always carried out.

According to this embodiment as described thus far, applying tone conversion to an image printed onto a printed material being illuminated makes it possible to suppress a situation where the light illuminating the printed material causes a drop in the contrast or luminance dynamic range of the printed material, for example.

Sixth Embodiment

Printed material coefficients based on actual measurements are used in the display systems described in the first to fifth embodiments. It is therefore necessary to measure the luminance in advance at the actual location (projection environment) where the printed material is placed, or at a place that emulates the actual location. However, such measurement is complicated, and measurements must be taken repeatedly each time the projection environment changes.

Accordingly, this embodiment provides a configuration in which the projection environment is measured with ease, without using a luminance meter, and the metadata for projection on a print is set or updated (this will be called "calibration" hereinafter).

Figure 19:
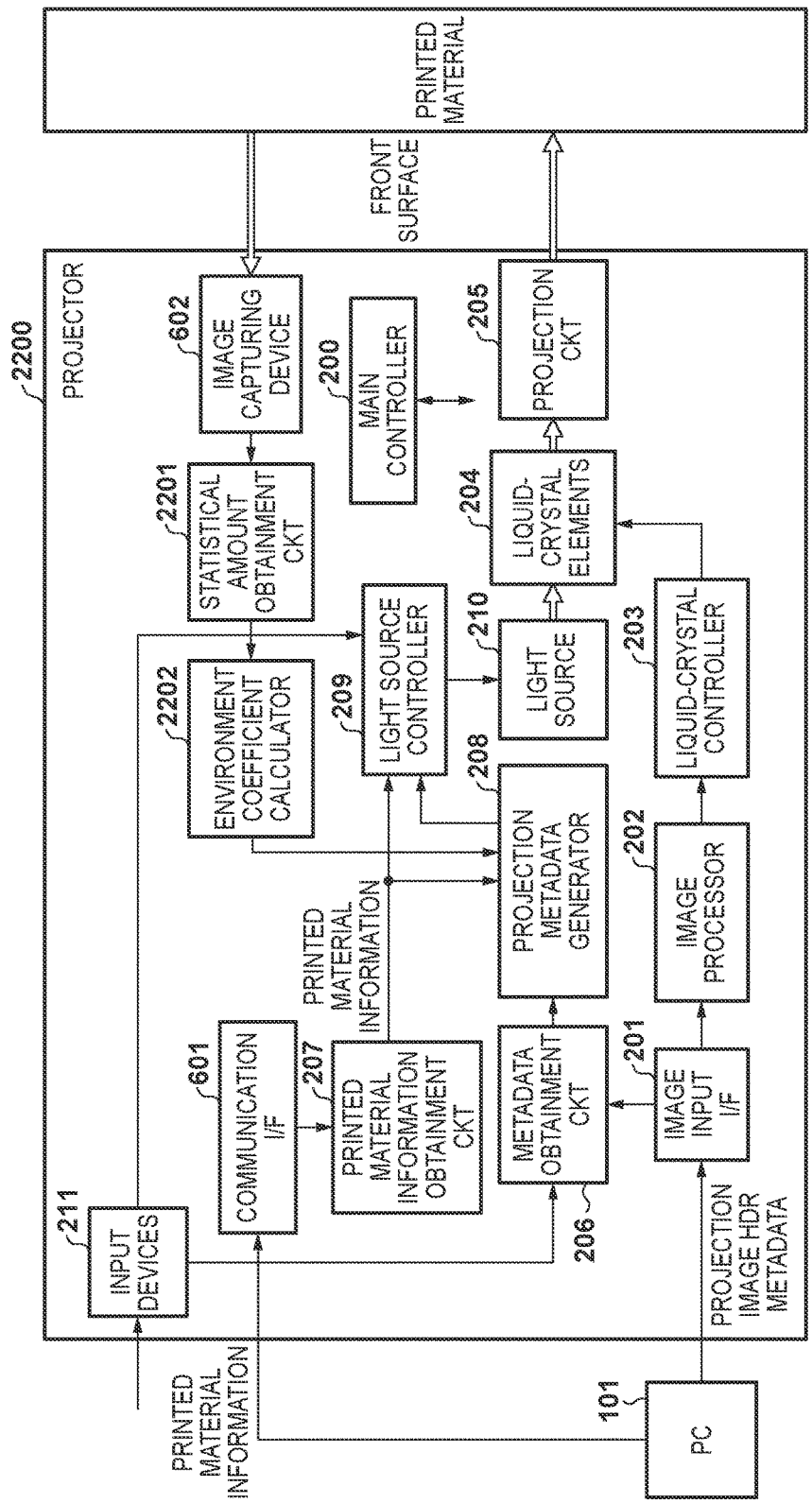
FIG. 19 is a block diagram illustrating a projector according to a sixth embodiment.

FIG. 19 illustrates an example of the functional configuration of the display system according to this embodiment. A projector 2200 characteristic to this embodiment has a configuration in which a statistical amount obtainment circuit 2201, an environment coefficient calculator 2202, and a projection metadata generator 2203 have been added to the configuration of the projector 102 according to the variation on the first embodiment, illustrated in FIG. 7. As such, the following descriptions will focus on the configurations added by this embodiment.

The statistical amount obtainment circuit 2201 determines a projection area of the projector 2200 included in an image captured by the image capturing device 602, and obtains a luminance statistical amount (environment information) of the projection area.

Specifically, the main controller 200 obtains captured images of a state of no projection (when the light source is unlit) and a state in which a whole-white image is projected (when the light source is lit) by controlling the light source controller 209 and the image capturing device 602, and supplies the captured images to the statistical amount obtainment circuit 2201. The statistical amount obtainment circuit 2201, which serves as environment obtainment means, determines the projection area within the captured image from a difference in the luminance of the captured images.

Figure 20A:
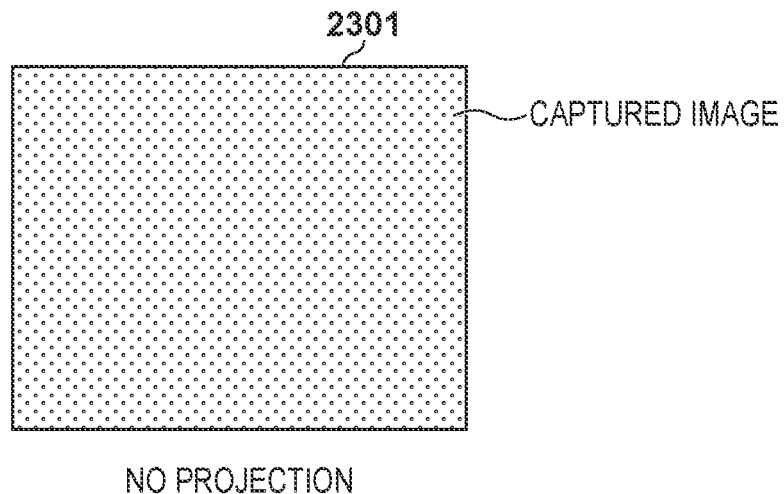
FIGS. 20A and 20B are schematic diagrams illustrating a captured image used in the sixth embodiment.
Figure 20B:
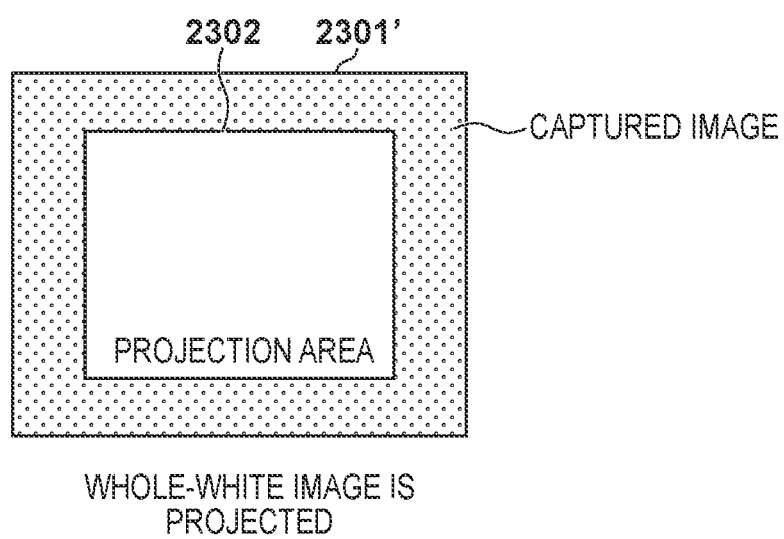

FIG. 20A schematically illustrates a captured image 2301 obtained in a state of no projection, and FIG. 20B schematically illustrates a captured image 2301' obtained in a state where a whole-white image is projected. The statistical amount obtainment circuit 2201 finds a difference between the luminance of the pixels corresponding between the two captured images, and specifies a projection area 2302 on the basis of an area where the differences are greater than or equal to a threshold. Next, the statistical amount obtainment circuit 2201 calculates, as the luminance statistical amount (the environment information), an average luminance (Average Pixel Level; APL) by dividing the total luminance by the total number of pixels, for the pixels within the projection area 2302 specified using the captured image 2301' obtained when projecting the whole-white image. The luminance statistical amount is then output to the environment coefficient calculator 2202.

The environment coefficient calculator 2202 calculates an environment coefficient from the luminance statistical amount received from the statistical amount obtainment circuit 2201. The environment coefficient calculator 2202 saves the luminance statistical amount received while in a measurement mode as a reference value. Then, using Formula 6, the environment coefficient calculator 2202 calculates the environment coefficient from the luminance statistical amount received while in the printed material projection mode and the saved reference value.

environment coefficient=obtained luminance statistical amount/reference value  (Formula 6)

The environment coefficient expresses a percentage of change from a luminance statistical amount obtained in the past (that is, an extent to which the environment has changed). The environment coefficient calculated by the environment coefficient calculator 2202 is output to the projection metadata generator 2203.

Using the following Formula 7, the projection metadata generator 2203 generates the metadata for projection on a print from the HDR metadata received from the metadata obtainment circuit 206, the printed material coefficient received from the printed material information obtainment circuit 207, and the environment coefficient received from the environment coefficient calculator 2202.

metadata for projection on a print [cd/m$^2$]=HDR metadata [cd/m$^2$]×1/printed material coefficient×1/environment coefficient  (Formula 7)

The method for using the metadata for projection on a print in the projection is the same as that described in the first embodiment.

Figure 21:
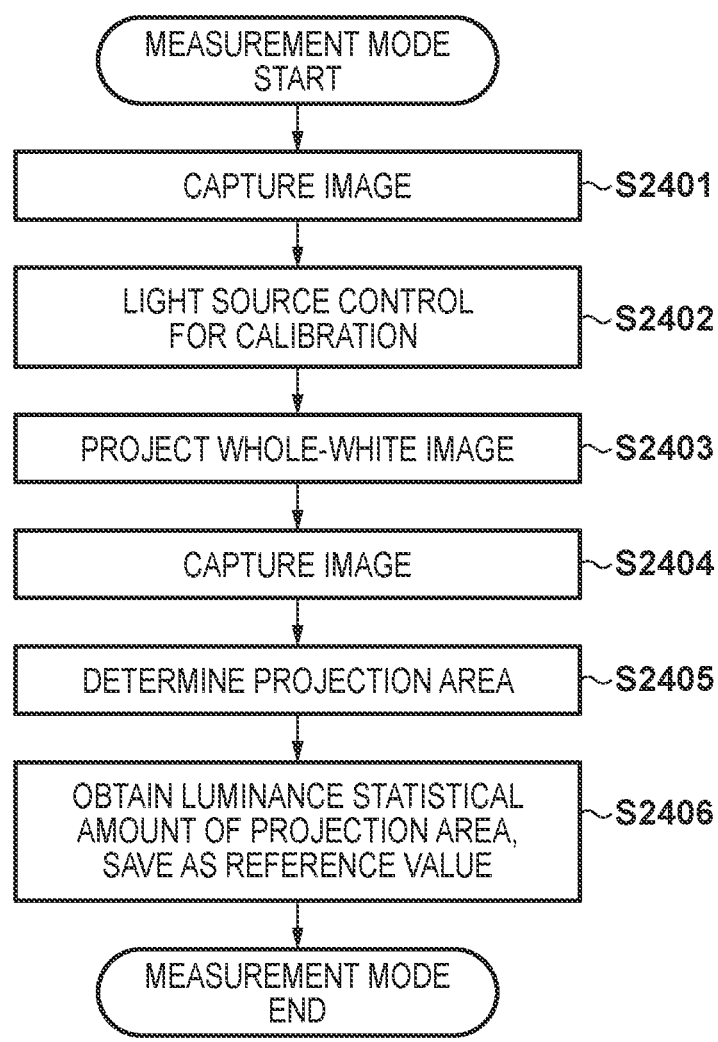
FIG. 21 is a flowchart pertaining to measurement mode operations according to the sixth embodiment.

FIG. 21 is a flowchart pertaining to measurement mode operations of the projector 2200 according to this embodiment. The main controller 200 of the projector 2200 transitions to the measurement mode in response to an instruction made through the input devices 211, for example, and executes the operations illustrated in FIG. 21.

In S2401, the main controller 200 causes the light source controller 209 to extinguish the light source 210, and causes the image capturing device 602 to capture an image. The image capturing device 602 outputs the captured image to the statistical amount obtainment circuit 2201.

In S2402, the main controller 200 causes the light source controller 209 to execute light source control for calibration. In the light source control for calibration, the light source controller 209 controls the light source 210 to emit light at a predetermined brightness (e.g., the maximum luminance).

In S2403, the main controller 200 controls all of the pixels in the liquid-crystal elements 204 to a maximum transmissivity through the liquid-crystal controller 203. As a result, a whole-white image is projected at the luminance under the light source control for calibration.

In S2404, the main controller 200 causes the image capturing device 602 to capture an image. A captured image in which the projection area is brighter than the surrounding areas is obtained as a result. The image capturing device 602 outputs the captured image to the statistical amount obtainment circuit 2201.

In S2405, the statistical amount obtainment circuit 2201 detects the projection area from the difference between the captured images received in S2401 and S2404, and outputs, to the environment coefficient calculator 2202, the pixel values, of the image captured while projecting the whole-white image, that are within the detected projection area.

In S2406, the environment coefficient calculator 2202 calculates the luminance statistical amount of the pixels within the projection area (the average luminance, here), saves that amount internally as a reference value, and ends the measurement mode operations.

Light source control operations of the projector 2200 will be described next using the flowcharts in FIGS. 22A and 22B, with particular attention given to operations when projecting onto a printed material. The operations illustrated in the flowcharts of FIGS. 22A and 22B are executed by the programmable processor of the main controller 200 loading a program stored in the ROM into the RAM and executing the program.

In FIGS. 22A and 22B, the operations from S501 to S506, and from S507 on, are the same as in the first embodiment (FIG. 6), and will therefore not be described here. Likewise, the operations from S2401 to S2405 are the same as those described with reference to FIG. 21, and will therefore not be described here.

After the printed material coefficient has been calculated in S506, in S2501, the main controller 200 determines whether or not to carry out calibration. If calibration is to be carried out, the process moves to S2401; if not, the process moves to S507. For example, the main controller 200 can determine whether or not to carry out calibration in accordance with a setting made through the input devices 211.

In S2502, the statistical amount obtainment circuit 2201 calculates the luminance statistical amount of the projection area and outputs that amount to the environment coefficient calculator 2202, in the same manner as in S2406.

In S2503, the environment coefficient calculator 2202 uses Formula 6 to calculate the environment coefficient from the luminance statistical amount calculated in S2502 and the reference value stored while in the measurement mode.

In S507, the projection metadata generator 2203 calculates the metadata for projection on a print. This embodiment differs from the first embodiment in that Formula 7 is used in order to apply the environment coefficient. S508 to S510 are the same operations as in the first embodiment, and will therefore not be described here.

According to this embodiment as described thus far, information pertaining to the brightness of the location where the printed material is placed is obtained on the basis of the luminance of pixels included in a projection range specified from a captured image. Accordingly, not only is it not necessary to use a luminance meter, but the measurement can also be repeated with ease. Additionally, saving the measurement value while in the measurement mode makes it possible to generate appropriate projection metadata even if the environment has changed by the time a measurement is taken again. This makes it possible to apply the intended luminance dynamic range to the printed material, even if the environment has changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although the foregoing embodiments describe a display device (illumination device) that illuminates a printed material having taken into consideration the characteristics of the printed material, the invention may be applied in a projection-type display device that projects an image onto a wall surface having taken into consideration the characteristics of the wall surface.

This application claims the benefit of Japanese Patent Application No. 2017-132257, filed on Jul. 5, 2017, which is hereby incorporated by reference herein in its entirety.

What is claimed is:

1. A display device capable of enhancing a dynamic range or a color gamut of a printed material by illuminating the printed material, the device comprising:
   an image input interface that receives an image for illuminating the printed material;
   an information obtainment circuit that obtains information pertaining to optical characteristics of the printed material; and
   a light source controller that controls, on the basis of metadata pertaining to a luminance or a color of the image and the information, a light source that illuminates the printed material.

2. The display device according to claim 1, further comprising:
   a metadata obtainment circuit that obtains the metadata.

3. The display device according to claim 2,
   wherein the metadata is a value pertaining to a maximum luminance or an average luminance.

4. The display device according to claim 2,
   wherein the metadata is a value pertaining to a color temperature of a white point; and
   on the basis of the value, the light source controller controls a balance between a plurality of color component lights emitted by the light source.

5. The display device according to claim 1,
   wherein the light source illuminates a printing surface of the printed material; and
   the information is information pertaining to a light reflectance of the printed material.

6. The display device according to claim 5,
wherein the printed material is illuminated by the light source projecting the image.

7. The display device according to claim 1,
wherein the light source illuminates a back surface of the printed material; and
the information is information pertaining to light transmission.

8. The display device according to claim 7,
wherein light source controller controls brightness of the light source based on the image in order to illuminate the back surface of the printed material by the light source.

9. The display device according to claim 1,
wherein the light source controller controls the light source so that an effect on the luminance of the illuminated printed material caused by differences in the optical characteristics of the printed material to be reduced.

10. The display device according to claim 1, further comprising: an environment obtainment circuit that obtains environment information from captured images of an area including a location where the printed material is placed that are captured when the light source is lit and when the light source is unlit, the environment information pertaining to a brightness at which the light source illuminates the location, wherein the light source controller further controls the light source on the basis of the environment information.

11. The display device according to claim 10,
wherein the environment obtainment circuit obtains a change from a reference value for the brightness at which the light source illuminates the location as the environment information.

12. The display device according to claim 11,
wherein the reference value is the environment information obtained in the past.

13. A projection-type display device that projects an image onto a projection surface using a light source, the device comprising:
an image input interface that receives the image;
an information obtainment circuit that obtains information pertaining to optical characteristics of the projection surface; and
a light source controller that controls the light source on the basis of metadata pertaining to a luminance or a color of the image and the information.

14. A display system comprising:
a display device; and
an information processing apparatus communicatively connected to the display device,
wherein the display device is capable of enhancing a dynamic range or a color gamut of a printed material by illuminating the printed material, the display device comprises:
an image input interface that receives from the information processing apparatus an image for illuminating the printed material;
an information obtainment circuit that obtains information pertaining to optical characteristics of the printed material; and
a light source controller that controls, on the basis of metadata pertaining to a luminance or a color of the image and the information, a light source that illuminates the printed material, and
wherein the information processing apparatus sends, to the display device, the image based on an image printed onto the printed material.

15. A control method of a display device capable of enhancing a dynamic range or a color gamut of a printed material by illuminating the printed material, the method comprising:
receiving an image for illuminating the printed material;
obtaining information pertaining to optical characteristics of the printed material; and
controlling, on the basis of metadata pertaining to a luminance or a color of the image and the information, a light source that illuminates the printed material.

16. A non-transitory computer-readable medium storing a program that causes a computer included in a display device being capable of enhancing a dynamic range or a color gamut of a printed material by illuminating the printed material to function as:
an image input unit that receives an image for illuminating the printed material;
an information obtainment unit that obtains information pertaining to optical characteristics of the printed material; and
a light source control unit that controls, on the basis of metadata pertaining to a luminance or a color of the image and the information, a light source that illuminates the printed material.

17. A non-transitory computer-readable medium storing a program that causes a computer included in a projection-type display device that projects an image onto a projection surface using a light source to function as:
an image input unit that receives the image;
an information obtainment unit that obtains information pertaining to optical characteristics of the projection surface; and
a light source control unit that controls the light source on the basis of metadata pertaining to a luminance or a color of the image and the information.

* * * * *